United States Patent
Zachar

(10) Patent No.: US 12,539,382 B2
(45) Date of Patent: Feb. 3, 2026

(54) CATHETER DYNAMIC TIP OCCLUSION

(71) Applicant: Airway Medix S.A., Warsaw (PL)

(72) Inventor: Oron Zachar, Tel Aviv (IL)

(73) Assignee: Airway Medix S.A., Warsaw (PL)

(*) Notice: Subject to any disclaimer, the term of this patent is extended or adjusted under 35 U.S.C. 154(b) by 794 days.

(21) Appl. No.: 17/678,883

(22) Filed: Feb. 23, 2022

(65) Prior Publication Data

US 2023/0009421 A1 Jan. 12, 2023

Related U.S. Application Data

(63) Continuation of application No. 16/301,989, filed as application No. PCT/IL2017/050546 on May 16, 2017, now abandoned.

(Continued)

(51) Int. Cl.
*A61M 16/04* (2006.01)
*A61M 16/20* (2006.01)

(52) U.S. Cl.
CPC .... *A61M 16/0463* (2013.01); *A61M 16/0434* (2013.01); *A61M 16/0479* (2014.02); *A61M 16/0488* (2013.01); *A61M 16/20* (2013.01)

(58) Field of Classification Search
CPC .......... A61B 17/12031; A61B 17/1204; A61B 17/12109; A61B 17/12136;

(Continued)

(56) References Cited

U.S. PATENT DOCUMENTS

| 3,211,150 A | 10/1965 | Foderick |
|---|---|---|
| 3,211,152 A | 10/1965 | Stern |

(Continued)

FOREIGN PATENT DOCUMENTS

| CN | 201516218 U | 6/2010 |
|---|---|---|
| CN | 102448537 A | 5/2012 |

(Continued)

OTHER PUBLICATIONS

Portelinha Jasmin et al., "Antimicrobial Peptides and Copper(II) Ions: Novel Therapeutic Opportunities", Chemical Reviews, vol. 121, No. 4, Feb. 1, 2021 (Feb. 1, 2021), p. 2648-2712.

(Continued)

*Primary Examiner* — Annette Dixon
(74) *Attorney, Agent, or Firm* — FisherBroyles, LLP; Ronni S. Jillions

(57) ABSTRACT

A catheter body (210) defines a distal-most suction orifice (444) and an outer lateral wall (592), which defines a lateral opening (448) therethrough into a suction lumen (530). An inflatable-element outer wall (590) of an inflatable element (588) is mounted to the catheter body (210). An inner membrane (589) is positioned within the inflatable element (588) and is mounted to the catheter body (210) around the lateral opening (448) along a seal perimeter (583) around the lateral opening (448), so as to define a collapsible membrane portion (596) that (a) covers the lateral opening (448), and (b) together with the inflatable-element outer wall (590), defines an inflatable chamber (587) between the inflatable-element outer wall (590) and the collapsible membrane portion (596). The inner membrane (589) entirely surrounds the catheter body (210).

20 Claims, 9 Drawing Sheets

Related U.S. Application Data

(60) Provisional application No. 62/376,102, filed on Aug. 17, 2016, provisional application No. 62/336,753, filed on May 16, 2016.

(58) Field of Classification Search
CPC ... A61B 17/12186; A61B 2017/00893; A61M 16/04; A61M 16/0456; A61M 2025/0018; A61M 2025/0025; A61M 2025/0042; A61M 2025/0073; A61M 2025/0079; A61M 2025/1052; A61M 2025/1061; A61M 2025/1063; A61M 2025/1079; A61M 2025/1097; A61M 2210/127; A61M 25/003; A61M 25/007; A61M 25/0075; A61M 25/09; A61M 25/10; A61M 25/1002; A61M 25/1011; A61M 25/104

See application file for complete search history.

(56) References Cited

U.S. PATENT DOCUMENTS

| | | |
|---|---|---|
| 3,502,069 A | 3/1970 | Silverman |
| 3,671,979 A | 6/1972 | Moulopoulos |
| 3,780,736 A | 12/1973 | Chen |
| 3,848,605 A * | 11/1974 | Harautuneian ....... A61M 16/04 |
| | | 604/100.01 |
| 4,240,433 A | 12/1980 | Bordow |
| 4,245,639 A | 1/1981 | La Rosa |
| 4,324,262 A | 4/1982 | Hall |
| 4,469,100 A | 9/1984 | Hardwick |
| 4,555,242 A | 11/1985 | Saudagar |
| 4,569,344 A | 2/1986 | Palmer |
| 4,606,347 A | 8/1986 | Fogarty et al. |
| 4,638,539 A | 1/1987 | Palmer |
| 4,691,702 A | 9/1987 | Chantzis |
| 4,734,094 A | 3/1988 | Jacob et al. |
| 4,762,125 A | 8/1988 | Leiman et al. |
| 4,805,611 A | 2/1989 | Hodgkins |
| 4,886,496 A | 12/1989 | Conoscenti et al. |
| 4,946,440 A | 8/1990 | Hall |
| 4,961,738 A | 10/1990 | Mackin |
| 5,073,164 A | 12/1991 | Hollister et al. |
| 5,101,817 A | 4/1992 | Etter |
| 5,134,996 A | 8/1992 | Bell |
| 5,139,018 A | 8/1992 | Brodsky et al. |
| 5,181,908 A | 1/1993 | Bell |
| 5,188,618 A | 2/1993 | Thomas |
| 5,215,522 A | 6/1993 | Page et al. |
| 5,250,029 A | 10/1993 | Lin et al. |
| 5,254,098 A | 10/1993 | Ulrich et al. |
| 5,277,177 A | 1/1994 | Page et al. |
| 5,309,902 A | 5/1994 | Kee et al. |
| 5,325,851 A | 7/1994 | Reynolds et al. |
| 5,336,172 A | 8/1994 | Bales et al. |
| 5,337,730 A | 8/1994 | Maguire |
| 5,349,950 A | 9/1994 | Ulrich et al. |
| 5,364,345 A | 11/1994 | Lowery et al. |
| 5,364,358 A | 11/1994 | Hewitt et al. |
| 5,460,613 A | 10/1995 | Ulrich et al. |
| 5,490,503 A | 2/1996 | Hollister |
| 5,545,179 A | 8/1996 | Williamson, IV |
| 5,611,336 A | 3/1997 | Page et al. |
| 5,634,937 A | 6/1997 | Mollenauer et al. |
| 5,694,922 A | 12/1997 | Palmer |
| 5,709,691 A | 1/1998 | Morejon |
| 5,715,815 A | 2/1998 | Lorenzen et al. |
| 5,730,123 A | 3/1998 | Lorenzen et al. |
| 5,738,091 A | 4/1998 | Kee et al. |
| 5,743,258 A | 4/1998 | Sato et al. |
| 5,779,687 A | 7/1998 | Bell et al. |
| 5,832,920 A | 11/1998 | Field |
| 6,082,361 A | 7/2000 | Morejon |
| 6,179,827 B1 | 1/2001 | Davis et al. |
| 6,227,200 B1 | 5/2001 | Crump et al. |
| 6,270,489 B1 | 8/2001 | Wise et al. |
| 6,318,368 B1 | 11/2001 | Morejon |
| 6,360,403 B1 | 3/2002 | Rubenach |
| 6,494,208 B1 | 12/2002 | Morejon |
| 6,679,262 B1 | 1/2004 | Morejon |
| 6,805,125 B1 | 10/2004 | Crump et al. |
| 6,918,893 B2 | 7/2005 | Houde et al. |
| 6,923,184 B1 | 8/2005 | Russo |
| 6,932,788 B2 | 8/2005 | Kamiyama et al. |
| 6,976,974 B2 | 12/2005 | Houde et al. |
| 7,021,313 B1 | 4/2006 | Crump et al. |
| 7,051,737 B2 | 5/2006 | Kolobow et al. |
| 7,060,135 B2 | 6/2006 | Morejon |
| 7,156,827 B2 | 1/2007 | McNary et al. |
| 7,172,572 B2 | 2/2007 | Diamond et al. |
| 7,179,272 B2 | 2/2007 | Kieturakis et al. |
| 7,188,623 B2 | 3/2007 | Anderson et al. |
| 7,191,782 B2 | 3/2007 | Madsen |
| 7,204,252 B2 | 4/2007 | Johnson |
| 7,278,429 B2 | 10/2007 | Johnson |
| 7,478,636 B2 | 1/2009 | Madsen et al. |
| 7,556,041 B2 | 7/2009 | Madsen |
| 7,669,600 B2 | 3/2010 | Morejon |
| 7,717,116 B2 | 5/2010 | Mijers |
| 7,726,315 B2 | 6/2010 | Field |
| 7,775,206 B2 | 8/2010 | Anderson et al. |
| 7,789,893 B2 | 9/2010 | Drasler et al. |
| 7,819,890 B2 | 10/2010 | Russo et al. |
| 7,854,728 B2 | 12/2010 | Boyle, Jr. |
| 7,878,202 B2 | 2/2011 | Anderson et al. |
| 7,967,811 B2 | 6/2011 | Kumar |
| 8,002,732 B2 | 8/2011 | Visconti |
| 8,133,326 B2 | 3/2012 | Bracken |
| 8,157,919 B2 | 4/2012 | Vazales et al. |
| 8,210,168 B2 | 7/2012 | Swisher |
| 8,215,306 B2 | 7/2012 | Brewer et al. |
| RE43,886 E | 1/2013 | Mijers |
| 8,381,345 B2 | 2/2013 | Vazales et al. |
| 8,382,908 B2 | 2/2013 | Vazales et al. |
| 8,414,544 B2 | 4/2013 | Resca |
| 8,434,488 B2 | 5/2013 | Li et al. |
| 8,458,844 B2 | 6/2013 | Vazales et al. |
| 8,468,637 B2 | 6/2013 | Vazales et al. |
| 8,534,287 B2 | 9/2013 | Vazales et al. |
| 8,557,054 B2 | 10/2013 | Morejon |
| 8,601,633 B2 | 12/2013 | Vazales et al. |
| 8,631,798 B2 | 1/2014 | Varga et al. |
| 8,783,255 B2 | 7/2014 | Maguire et al. |
| 8,999,074 B2 | 4/2015 | Zachar et al. |
| 9,010,322 B2 | 4/2015 | Swisher |
| 9,095,286 B2 | 8/2015 | Vazales et al. |
| 9,119,926 B2 | 9/2015 | Cuevas et al. |
| 9,131,988 B2 | 9/2015 | Bagwell et al. |
| 9,220,859 B2 | 12/2015 | Li et al. |
| 9,248,249 B2 | 2/2016 | Li et al. |
| 9,332,891 B2 | 5/2016 | Vazales et al. |
| 9,352,112 B2 | 5/2016 | Sederstrom et al. |
| 9,386,907 B2 | 7/2016 | Vazales et al. |
| 9,398,837 B2 | 7/2016 | Vazales et al. |
| 9,480,537 B2 | 11/2016 | Stadelman et al. |
| 2003/0145860 A1 | 8/2003 | Johnson |
| 2003/0209258 A1 | 11/2003 | Morejon |
| 2003/0216698 A1 | 11/2003 | McNary et al. |
| 2004/0082923 A1 | 4/2004 | Field |
| 2004/0221851 A1 | 11/2004 | Madsen |
| 2004/0221852 A1 | 11/2004 | Madsen |
| 2005/0172971 A1 | 8/2005 | Kolobow et al. |
| 2005/0279359 A1 | 12/2005 | LeBlanc et al. |
| 2006/0005841 A1 | 1/2006 | Anderson et al. |
| 2006/0130847 A1 | 6/2006 | Morejon |
| 2006/0150981 A1 | 7/2006 | Johnson |
| 2006/0207605 A1 | 9/2006 | Anderson et al. |
| 2006/0278235 A1 | 12/2006 | White et al. |
| 2007/0021651 A1 | 1/2007 | Gobel |
| 2007/0089748 A1 | 4/2007 | Madsen et al. |
| 2007/0163599 A1 | 7/2007 | Mijers |
| 2007/0282250 A1 | 12/2007 | Anderson et al. |
| 2008/0035154 A1 | 2/2008 | Johnson |

(56) References Cited

U.S. PATENT DOCUMENTS

| | | |
|---|---|---|
| 2008/0047562 A1 | 2/2008 | Colburn et al. |
| 2008/0066746 A1 | 3/2008 | Nelson et al. |
| 2008/0114338 A1 | 5/2008 | Kumar |
| 2008/0121236 A1 | 5/2008 | Field |
| 2008/0167606 A1 | 7/2008 | Dann et al. |
| 2008/0210235 A1 | 9/2008 | Field et al. |
| 2009/0178681 A1 | 7/2009 | Bracken |
| 2009/0281483 A1 | 11/2009 | Baker et al. |
| 2009/0287151 A1 | 11/2009 | Resca |
| 2010/0010431 A1 | 1/2010 | Tulley |
| 2010/0081896 A1 | 4/2010 | Swisher |
| 2010/0147309 A1 | 6/2010 | Cuevas et al. |
| 2010/0147310 A1 | 6/2010 | Brewer et al. |
| 2010/0147312 A1 | 6/2010 | Brewer et al. |
| 2010/0170517 A1 | 7/2010 | Hackner |
| 2010/0186748 A1 | 7/2010 | Morejon |
| 2010/0199448 A1 | 8/2010 | Vazales et al. |
| 2010/0199999 A1 | 8/2010 | Vazales et al. |
| 2010/0307507 A1 | 12/2010 | Li et al. |
| 2010/0307508 A1 | 12/2010 | Li et al. |
| 2011/0023884 A1 | 2/2011 | Cuevas et al. |
| 2011/0023885 A1 | 2/2011 | Vazales et al. |
| 2011/0023886 A1 | 2/2011 | Vazales et al. |
| 2011/0023887 A1 | 2/2011 | Vazales et al. |
| 2011/0023888 A1 | 2/2011 | Vazales et al. |
| 2011/0186052 A1 | 8/2011 | Morejon |
| 2011/0197894 A1 | 8/2011 | Morejon |
| 2012/0024293 A1 | 2/2012 | Maguire et al. |
| 2012/0172835 A1 | 7/2012 | Becker |
| 2012/0180791 A1 | 7/2012 | Ciccone |
| 2012/0247479 A1 | 10/2012 | Varga et al. |
| 2012/0289893 A1 | 11/2012 | Chung |
| 2012/0296283 A1 | 11/2012 | Swisher |
| 2013/0023729 A1 | 1/2013 | Vazales et al. |
| 2013/0030249 A1 | 1/2013 | Vazales et al. |
| 2013/0046332 A1 | 2/2013 | Jones et al. |
| 2013/0112207 A1 | 5/2013 | Roth |
| 2013/0146063 A1 | 6/2013 | Sederstrom et al. |
| 2013/0218071 A1 | 8/2013 | Resca |
| 2013/0228196 A1 | 9/2013 | Vazales et al. |
| 2014/0012074 A1 | 1/2014 | Vazales et al. |
| 2014/0020682 A1 | 1/2014 | Li et al. |
| 2014/0033455 A1 | 2/2014 | Vazales et al. |
| 2014/0090194 A1 | 4/2014 | Stadelman et al. |
| 2014/0090195 A1 | 4/2014 | Stadelman et al. |
| 2014/0090642 A1 | 4/2014 | Bagwell et al. |
| 2014/0142496 A1 | 5/2014 | Zachar et al. |
| 2014/0150782 A1 | 6/2014 | Vazales et al. |
| 2014/0246015 A1 | 9/2014 | Einav et al. |
| 2014/0283875 A1 | 9/2014 | Vazales et al. |
| 2014/0290649 A1 | 10/2014 | Maguire et al. |
| 2015/0133864 A1 | 5/2015 | Zachar |
| 2015/0209536 A1 | 7/2015 | Roth |
| 2015/0335842 A1 | 11/2015 | Cuevas et al. |
| 2015/0343182 A1* | 12/2015 | Vazales .............. A61M 16/0463 604/267 |
| 2016/0082212 A1 | 3/2016 | Li et al. |
| 2016/0121066 A1 | 5/2016 | Zachar et al. |
| 2016/0193011 A1 | 7/2016 | Vazales et al. |
| 2016/0193439 A1 | 7/2016 | Zachar et al. |
| 2016/0199608 A1 | 7/2016 | Morejon |
| 2016/0250431 A1 | 9/2016 | Sederstrom et al. |
| 2016/0287834 A1 | 10/2016 | Bennett |
| 2017/0106160 A1 | 4/2017 | Zachar |
| 2017/0189589 A1 | 7/2017 | Zachar et al. |
| 2017/0326317 A1 | 11/2017 | Zachar |

FOREIGN PATENT DOCUMENTS

| | | |
|---|---|---|
| CN | 102711897 A | 10/2012 |
| CN | 103767760 A | 5/2014 |
| CN | 204208149 U | 3/2015 |
| CN | 104689436 A | 6/2015 |
| CN | 105208946 A | 12/2015 |
| CN | 109475668 A | 3/2019 |
| EP | 1239907 B1 | 9/2007 |
| EP | 2928517 A1 | 10/2015 |
| JP | 63-270064 A | 11/1998 |
| JP | 2014525285 A | 9/2014 |
| JP | 2014527412 A | 10/2014 |
| WO | 99/38548 A2 | 8/1999 |
| WO | 2012087837 A1 | 6/2012 |
| WO | 2012/131626 A2 | 10/2012 |
| WO | 2013/030821 A1 | 3/2013 |
| WO | 2014089028 A1 | 6/2014 |
| WO | 2017118970 A1 | 7/2017 |
| WO | 2017199248 A1 | 11/2017 |

OTHER PUBLICATIONS

Boas Daniel et al., "A Novel Copper-Binding Peptide That Self-Assembles Into a Transparent Antibacterial and Antiviral Coating", Frontiers in Bioengineering and Biotechnology, vol. 9, Oct. 20, 2021 (Oct. 20, 2021).

International Search Report from PCT/IL2017/050546; dated Sep. 25, 2017.

* cited by examiner

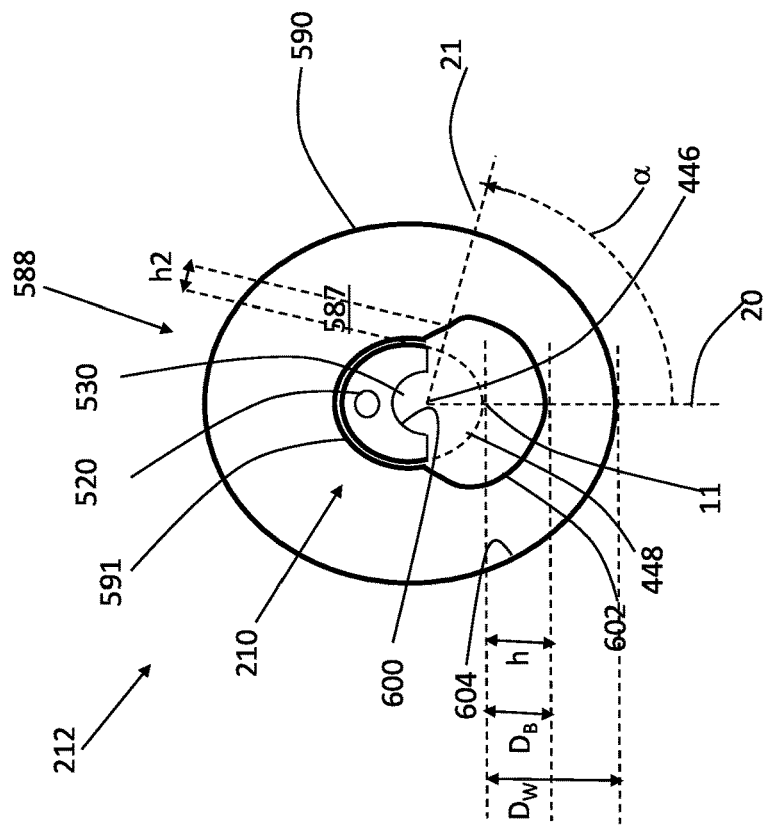
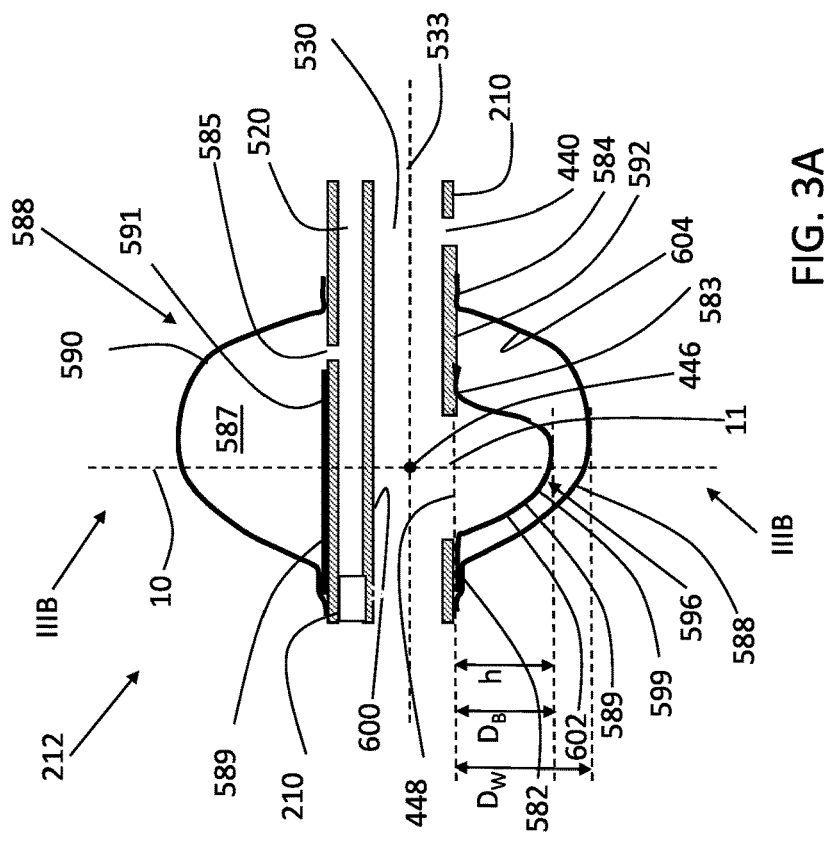
FIG. 3A
FIG. 3B

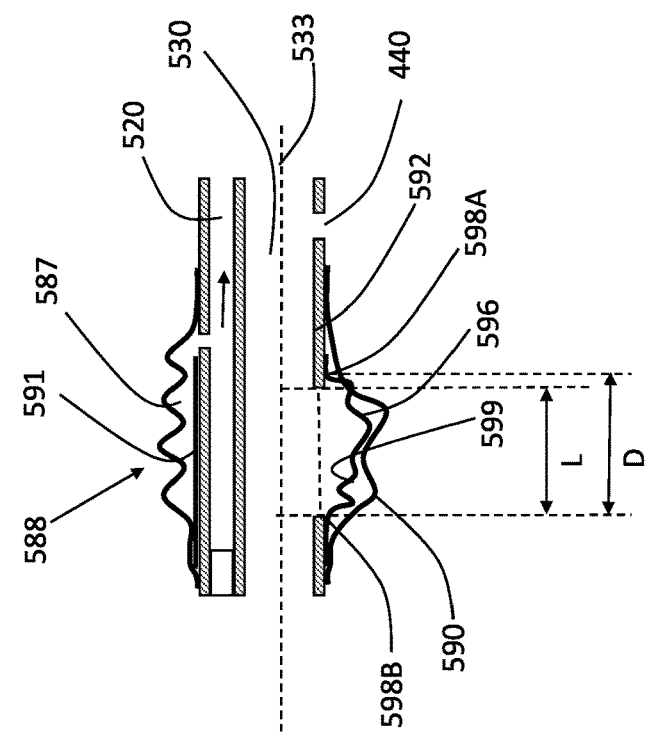
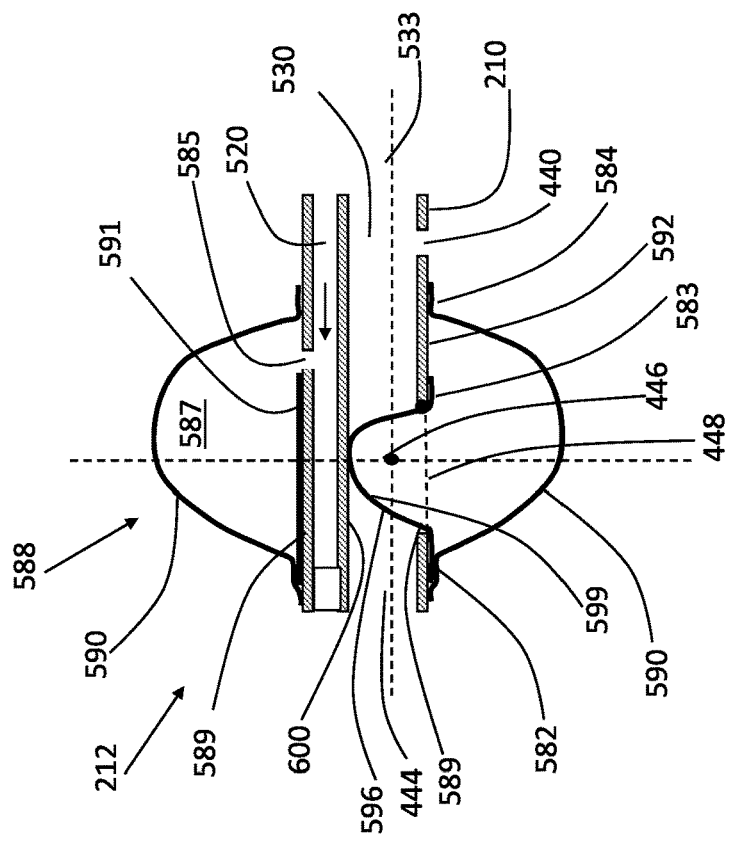
FIG. 3D
FIG. 3C

CATHETER DYNAMIC TIP OCCLUSION

CROSS-REFERENCE TO RELATED APPLICATIONS

PCT/IL2017/050546 was filed on May 16, 2017 and is incorporated herein by reference in its entirety. PCT/IL2017/050546 claims priority from U.S. Provisional Application 62/336,753, filed May 16, 2016, and U.S. Provisional Application 62/376,102, filed Aug. 17, 2016, both of which are incorporated herein by reference. The present application is a continuation of U.S. application Ser. No. 16/301,989 which is a 371 national stage entry of PCT/IL2017/050546. U.S. application Ser. No. 16/301,989 is incorporated by reference in its entirety.

FIELD OF THE APPLICATION

The present invention relates generally to medical suction catheter devices, and specifically to catheter devices for aspiration of tracheobronchial secretions and/or cleaning of tracheal ventilation tubes.

BACKGROUND OF THE APPLICATION

Suction catheters are commonly used to aspirate tracheobronchial fluids in patients ventilated with endotracheal tube (ETT) and tracheostomy tube devices. A problematic aspect of the use of suction catheters is the presence of bacterial biofilm within the ETT lumen through which the suction catheter passes. Consequently, as the suction catheter is inserted, there is high risk of it carrying bacterial biofilm from the ETT lumen deeper into the bronchial tree where the suction catheter reaches, and thereby increasing the risk of lung infection. Moreover, buildup of substantial biofilm thickness reduces the effective free lumen of the ETT for air passage. Therefore, there is a need for maintaining cleaner ETT lumens between suction operations, and preventing buildup of significant biofilm thickness.

U.S. Pat. No. 8,999,074 to Zachar et al., which is assigned to the assignee of the present application and is incorporated herein by reference, describes a cleaning catheter that includes fluid-delivery and suction lumens. A flow regulator defines suction and fluid ports. A mechanical user control element is configured to mechanically and non-electrically set activation states of the flow regulator, and transition between first and third configurations via a second configuration. When the control element is in the first configuration, the flow regulator blocks fluid communication (a) between the suction port and the suction lumen and (b) between the fluid port and the fluid-delivery lumen. When the control element is in the second configuration, the flow regulator effects fluid communication between the suction port and the suction lumen, and blocks fluid communication between the fluid port and the fluid-delivery lumen. When the control element is in the third configuration, the flow regulator effects fluid communication (a) between the suction port and the suction lumen and (b) between the fluid port and the fluid-delivery lumen.

U.S. Pat. No. 5,360,403 to Mische describes an apparatus for and method of selectively occluding a lumen of a multilumen catheter during a medical procedure. The catheter may have any variety of functions of either diagnostic and/or therapeutic nature. A first open lumen to be occluded may have one or more orifices at the distal tip and/or in the side wall of the catheter for infusion of a liquid, injection of a dye, or operation of a guide wire or other control device. A small balloon adjacent the lumen to be occluded is inflated with fluid from a second, closed lumen. Whenever the small balloon is completely inflated, the first, open lumen is occluded. Whenever the small balloon is deflated, the lumen is open to the orifices distal to the small balloon.

SUMMARY OF THE APPLICATION

Some applications of the present invention provide a cleaning catheter for cleaning an inner surface of a tracheal ventilation tube. The cleaning catheter comprises an elongate, flexible, tubular catheter body, and an inflatable element, such as a balloon, which is mounted to the catheter body, typically near a distal end of the catheter body. The inflatable element is inflatable into contact with an inner surface of the tracheal ventilation tube. The catheter body is shaped so as to define distal-most suction orifice, at a distal end of a distal portion of the cleaning catheter, distal to the inflatable element; a suction lumen; and one or more fluid-delivery lumens, which provide fluid communication between an inflation inlet and at least one inflation port which is in fluid communication with an inflatable chamber of the inflatable element. The suction lumen is arranged along the catheter body, and includes a proximal longitudinal portion, which is coupleable in fluid communication with a suction source. The distal-most suction orifice is in fluid communication with a distal portion of the suction lumen, and enables the cleaning system to selectively apply suction to the trachea.

An outer lateral wall of the catheter body is shaped so as to define a lateral opening therethrough into the suction lumen. The cleaning catheter further comprises an inner membrane, which is at least partially positioned within an interior of the inflatable element and is mounted to the catheter body around the lateral opening along an air-tight seal perimeter that surrounds the lateral opening, so as to define a collapsible membrane portion that covers the lateral opening. Together with an outer wall of the inflatable element, the collapsible membrane portion defines the inflatable chamber between the inflatable-element outer wall and the collapsible membrane portion. The seal perimeter defines a straight distance between two points on the seal perimeter that are most distant from each other.

For some applications, the catheter body is shaped to additionally define one or more lateral suction orifices, which are located proximal to the inflatable element, and are in fluid communication with the suction lumen. Each of the lateral suction orifices is defined by an opening extending through the outer wall of the catheter body into the suction lumen at an axial location proximal to the inflatable element. The lateral suction orifices are supplied with negative pressure by the suction source and facilitate cleaning of the inner surface of the tracheal ventilation tube.

For some applications, the inner membrane is arranged such that:

the collapsible membrane portion has excess material that covers the lateral opening such that a total length of a shortest path along the collapsible membrane portion between the two most distant points on the seal perimeter of the lateral opening equals at least 120% of the straight distance between the two points, at least when the inflatable chamber is at ambient pressure, at least when the inflatable chamber is at ambient pressure, the proximal longitudinal portion of the suction lumen is in fluid communication with the distal-most suction orifice, and at least when the inflatable chamber is at a gauge pressure of 0.5 atm, the collapsible membrane portion assumes an occluding state, in which the collapsible membrane portion extends through the lateral opening into the suction lumen and at least partially touches an inner surface of the suction lumen across from the lateral opening, thereby at least partially occluding the suction lumen and modulating a level of suction fluid flow into the suction lumen through the distal-most suction orifice.

In other words, when the inflatable element is inflated, the inflation also causes inflation and expansion of the inflatable chamber and of the collapsible membrane portion into the suction lumen, so as to at least partially occlude the passage between the distal-most suction orifice (which is distal to the inflatable element) and the one or more lateral suction orifices (which are proximal to the inflatable element), thereby modulating a level of suction delivered to the distal-most suction orifice via the suction lumen. Such partial occlusion also inhibits fluid communication between the one or more lateral suction orifices and the distal-most suction orifice through the suction lumen.

For some applications, when the inflatable chamber is at ambient pressure, the collapsible membrane portion is biased to assume a resting bulged state, in which the collapsible membrane portion is shaped so as to define a bulge portion having a greatest bulge distance from the seal perimeter of at least 1 mm, measured radially outward or radially inward from the seal perimeter.

In some applications, because of the greatest bulge distance and the structure of the collapsible membrane portion in the resting state, the collapsible membrane portion does not need to stretch much or at all in order to come into contact with the inner surface of the suction lumen in order to at least partially occlude the suction lumen. Moreover, because of the greatest bulge distance and the structure of the collapsible membrane portion in the resting state, occlusion of the suction lumen is not very sensitive to the inflation pressure. For example, providing only 0.2 atm inflation gauge pressure may be sufficient to cause the collapsible membrane portion to come into contact with the inner surface of the suction lumen in order to at least partially occlude the suction lumen. In contrast, in some conventional techniques, in which the collapsible membrane portion does not have excess surface area when at ambient pressure, the membrane needs to stretch substantially in order to sufficient occlude the suction lumen. In order to enable this substantial stretching, either high inflation pressure is needed (typically gauge pressure of at least 1 atm), or, to stretch at lower pressure, the membrane needs very high elasticity. To provide such high elasticity using commercially-available medical-grade materials, the membrane either needs to be very thick or very fragile. These limitations pose at least the following problems: they limit substantially the range of materials that can be used, and/or render the catheter tip area diameter too thick due to the multi-layering of the inner membrane and outer balloon attachments on the catheter, and/or render the construction too prone to tearing to meet medical device safety requirements.

For some applications, the inflatable-element outer wall and the inner membrane are arranged such that at least when the inflatable chamber is at a negative gauge pressure of 0.2 atm, the inflatable chamber assumes a collapsed state, in which the collapsible membrane portion is drawn at least partially, such as entirely, out of the suction lumen and at least partially touches the inner surface of the inflatable-element outer wall. The occlusion of the suction lumen is thus reversible. Because of the excess surface area of the collapsible membrane portion, the collapsible membrane portion is typically crumpled with folds.

There is therefore provided, in accordance with an application of the present invention, apparatus for use with a suction source, the apparatus including a cleaning catheter, which includes:

an elongate, tubular catheter body, which is shaped so as to define (a) a distal-most suction orifice, (b) a suction lumen, which (i) is arranged along the catheter body at least partially within the catheter body, and (ii) includes a proximal longitudinal portion that is coupleable in fluid communication with the suction source, and (c) an outer lateral wall, which is shaped so as to define a lateral opening therethrough into the suction lumen, wherein the lateral opening is disposed distal to the proximal longitudinal portion of the suction lumen;

an inflatable element, which includes an inflatable-element outer wall, and is mounted to the catheter body; and an inner membrane, which:
is at least partially positioned within an interior of the inflatable element and is mounted to the catheter body around the lateral opening along an air-tight seal perimeter that surrounds the lateral opening, so as to define a collapsible membrane portion that covers the lateral opening, and, together with the inflatable-element outer wall, defines an inflatable chamber between the inflatable-element outer wall and the collapsible membrane portion,
entirely surrounds the catheter body, and
is arranged such that at least when the inflatable chamber is at ambient pressure, the proximal longitudinal portion of the suction lumen is in fluid communication with the distal-most suction orifice.

For some applications, a circumferential portion of the inner membrane snugly touches a circumferential portion of the outer lateral wall of the catheter body, which circumferential portion does not define the lateral opening.

For some applications, the seal perimeter defines a straight distance between two points on the seal perimeter that are most distant from each other, and the inner membrane is arranged such that the collapsible membrane portion has excess material that covers the lateral opening such that a total length of a shortest path along the collapsible membrane portion between the two most distant points on the seal perimeter of the lateral opening equals at least 120% of the straight distance between the two points, at least when the inflatable chamber is at ambient pressure.

For some applications, the shortest path along the collapsible membrane portion equals at least 150% of the straight distance the two points, at least when the inflatable chamber is at ambient pressure.

For some applications, a surface area of the collapsible membrane portion varies by less than 30% between when the inflatable chamber is at ambient pressure and when the inflatable chamber is at a positive gauge pressure of 0.5 atm.

For some applications, the catheter body is shaped so as to define one or more lateral suction orifices, which are located proximal to the inflatable element, and are in fluid communication with the suction lumen.

For some applications, the inflatable element has a greatest diameter of between 6 and 12 mm when inflated at 0.5 atm gauge pressure and unconstrained.

For some applications, at least when the inflatable chamber is at ambient pressure, the collapsible membrane portion is axially surrounded by the inflatable chamber.

For some applications, the inner membrane is arranged such that at least when the inflatable chamber is at a gauge pressure of 0.5 atm, the collapsible membrane portion assumes an occluding state, in which the collapsible membrane portion at least partially touches an inner surface of the suction lumen across from the lateral opening, thereby at least partially occluding the suction lumen and modulating a level of suction fluid flow into the suction lumen through the distal-most suction orifice.

For some applications, when the inflatable chamber is at ambient pressure, the collapsible membrane portion is biased to assume a bulged state, in which the collapsible membrane portion is shaped so as to define a bulge portion having a greatest bulge distance from the seal perimeter of at least 1 mm, measured radially outward or radially inward from the seal perimeter. For some applications, the greatest bulge distance is at least 1.5 mm. For some applications, the bulge portion bulges radially outward and not radially inward. For some applications, the inflatable-element outer wall and the inner membrane are arranged such that at least when the collapsible membrane portion assumes the bulged state, the collapsible membrane portion touches an inner surface of the inflatable-element outer wall. For some applications, the inflatable-element outer wall and the inner membrane are arranged such that at least when the collapsible membrane portion assumes the bulged state, the collapsible membrane portion does not touch an inner surface of the inflatable-element outer wall.

For some applications, when the inflatable chamber is at ambient pressure, the collapsible membrane portion touches an inner surface of the inflatable-element outer wall.

For some applications, the inflatable-element outer wall and the inner membrane are arranged such that at least when the inflatable chamber is at a negative gauge pressure of 0.2 atm, the collapsible membrane portion is crumpled with folds. For some applications, a circumferential portion of the inner membrane snugly touches a circumferential portion of the outer lateral wall of the catheter body, which circumferential portion does not define the lateral opening. For some applications, the circumferential portion of the inner membrane surrounds at least 180 degrees of the catheter body, and the collapsible membrane portion surrounds at least 60 degrees of the catheter body.

For some applications, the inflatable-element outer wall and the inner membrane are arranged such that at least when the inflatable chamber is at a negative gauge pressure of 0.2 atm, the inflatable chamber assumes a collapsed state, in which the collapsible membrane portion only partially touches an inner surface of the inflatable-element outer wall.

For some applications, when the inflatable chamber is at ambient pressure, the collapsible membrane portion is biased to assume a bulged state, in which the collapsible membrane portion is shaped so as to define a bulge portion having a greatest bulge distance from the seal perimeter of at least 1 mm, measured radially outward or radially inward from the seal perimeter.

For some applications, the inflatable-element outer wall and the inner membrane are arranged such that at least when the inflatable chamber assumes the bulged state, the collapsible membrane portion does not touch the inner surface of the inflatable-element outer wall.

For Some Applications:
the inner membrane is arranged such that at least when the inflatable chamber is at a gauge pressure of 0.5 atm, the collapsible membrane portion assumes an occluding state, in which the collapsible membrane portion at least partially touches an inner surface of the suction lumen across from the lateral opening, thereby at least partially occluding the suction lumen and modulating a level of suction fluid flow into the suction lumen through the distal-most suction orifice, and the inner membrane is arranged such that when the proximal longitudinal portion of the suction lumen is in the fluid communication with the suction source and the suction source provides suction at negative 0.1 atm gauge pressure:
  a first level of suction fluid flow flows through the distal-most suction orifice when the collapsible membrane portion is in the occluding state,
  a second level of suction fluid flow flows through the distal-most suction orifice when the collapsible membrane portion is in the collapsed state, and
  the first level of suction is less than 50% of the second level of suction.

For some applications, the proximal longitudinal portion of the suction lumen is coupled in fluid communication with the suction source.

For some applications, the cleaning catheter includes a suction-source connector, which is in fluid communication with the proximal longitudinal portion of the suction lumen, and which is shaped so as to define a male conical fitting with a taper for coupling to the suction source. For some applications, the taper is at least a 5% taper. For some applications, the taper is a 6% taper, and the male conical fitting with the 6% taper complies with International Standard ISO 594-1:1986.

There is further provided, in accordance with an application of the present invention, apparatus for use with a suction source, the apparatus including a cleaning catheter, which includes:
  an elongate, tubular catheter body, which is shaped so as to define (a) a distal-most suction orifice, (b) a suction lumen, which (i) is arranged along the catheter body at least partially within the catheter body, and (ii) includes a proximal longitudinal portion that is coupleable in fluid communication with the suction source, and (c) an outer lateral wall, which is shaped so as to define a lateral opening therethrough into the suction lumen, wherein the lateral opening is disposed distal to the proximal longitudinal portion of the suction lumen;
  an inflatable element, which includes an inflatable-element outer wall, and is mounted to the catheter body; and
  an inner membrane, which is at least partially positioned within an interior of the inflatable element and is mounted to the catheter body around the lateral opening along an air-tight seal perimeter that surrounds the lateral opening, so as to define a collapsible membrane portion that covers the lateral opening, and, together with the inflatable-element outer wall, defines an inflatable chamber between the inflatable-element outer wall and the collapsible membrane portion, wherein the seal perimeter defines a straight distance between two points on the seal perimeter that are most distant from each other, wherein the inner membrane is arranged such that:
  (a) the collapsible membrane portion has excess material that covers the lateral opening such that a total length of a shortest path along the collapsible membrane portion between the two most distant points on the seal perimeter of the lateral opening equals at least 120% of the straight distance between the two points, at least when the inflatable chamber is at ambient pressure, and
  (b) at least when the inflatable chamber is at ambient pressure, the proximal longitudinal portion of the suction lumen is in fluid communication with the distal-most suction orifice.

For some applications, the shortest path along the collapsible membrane portion equals at least 150% of the straight distance the two points, at least when the inflatable chamber is at ambient pressure.

For some applications, a surface area of the collapsible membrane portion varies by less than 30% between when the inflatable chamber is at ambient pressure and when the inflatable chamber is at a positive gauge pressure of 0.5 atm.

For some applications, the catheter body is shaped so as to define one or more lateral suction orifices, which are located proximal to the inflatable element, and are in fluid communication with the suction lumen.

For some applications, at least one of the one or more lateral suction orifices are located within 3 cm of the inflatable element, measured along a central longitudinal axis of the suction lumen.

For some applications, the inflatable element is mounted to the catheter body at a location within 5 cm of a distal end of the catheter body.

For some applications, the inflatable element has a greatest diameter of between 6 and 12 mm when inflated at 0.5 atm gauge pressure and unconstrained.

For some applications, an axial length of the lateral opening, measured parallel to a central longitudinal axis of the suction lumen, equals between 100% and 300% of a largest diameter of a cross-section of the suction lumen perpendicular to the central longitudinal axis.

For some applications, the catheter body is shaped so as to define exactly one suction lumen.

For some applications, the apparatus further includes a pliable sleeve around at least a portion of the catheter body to inhibit contamination.

For some applications, at least when the inflatable chamber is at ambient pressure, the collapsible membrane portion is axially surrounded by the inflatable chamber.

For some applications, at least a portion of an edge of the seal perimeter closest to the lateral opening is disposed at a distance from a perimeter of the lateral opening, the distance measured in one or more directions other than radially.

For some applications, the inner membrane is arranged such that at least when the inflatable chamber is at a gauge pressure of 0.5 atm, the collapsible membrane portion assumes an occluding state, in which the collapsible membrane portion at least partially touches an inner surface of the suction lumen across from the lateral opening, thereby at least partially occluding the suction lumen and modulating a level of suction fluid flow into the suction lumen through the distal-most suction orifice.

For some applications, the inner membrane is arranged such that the collapsible membrane portion assumes the occluding state at least when the gauge pressure is 0.2 atm.

For some applications, the inner membrane is arranged such that the collapsible membrane portion assumes the occluding state at least when the gauge pressure is 0.1 atm.

For some applications, the inner membrane entirely surrounds the catheter body.

For some applications, a circumferential portion of the inner membrane snugly touches a circumferential portion of the outer lateral wall of the catheter body, which circumferential portion does not define the lateral opening.

For some applications, the inflatable-element outer wall and the inner membrane are arranged such that at least when the inflatable chamber is at a negative gauge pressure of 0.2 atm, the collapsible membrane portion is crumpled with folds. For some applications, a circumferential portion of the inner membrane snugly touches a circumferential portion of the outer lateral wall of the catheter body, which circumferential portion does not define the lateral opening. For some applications, the circumferential portion of the inner membrane surrounds at least 180 degrees of the catheter body, and the collapsible membrane portion surrounds at least 60 degrees of the catheter body.

For some applications, when the inflatable chamber is at ambient pressure, the collapsible membrane portion is biased to assume a bulged state, in which the collapsible membrane portion is shaped so as to define a bulge portion having a greatest bulge distance from the seal perimeter of at least 1 mm, measured radially outward or radially inward from the seal perimeter.

For some applications, the greatest bulge distance is at least 1.5 mm.

For some applications, the bulge portion bulges radially outward and not radially inward.

For some applications, the inflatable-element outer wall and the inner membrane are arranged such that at least when the collapsible membrane portion assumes the bulged state, the collapsible membrane portion touches an inner surface of the inflatable-element outer wall.

For some applications, the inflatable-element outer wall and the inner membrane are arranged such that at least when the collapsible membrane portion assumes the bulged state, the collapsible membrane portion does not touch an inner surface of the inflatable-element outer wall.

For some applications, when the inflatable chamber is at ambient pressure, the collapsible membrane portion touches an inner surface of the inflatable-element outer wall.

For some applications, the inflatable-element outer wall and the inner membrane are arranged such that at least when the inflatable chamber is at a negative gauge pressure of 0.2 atm, the inflatable chamber assumes a collapsed state, in which the collapsible membrane portion only partially touches an inner surface of the inflatable-element outer wall.

For some applications, when the inflatable chamber is at ambient pressure, the collapsible membrane portion is biased to assume a bulged state, in which the collapsible membrane portion is shaped so as to define a bulge portion having a greatest bulge distance from the seal perimeter of at least 1 mm, measured radially outward or radially inward from the seal perimeter.

For some applications, the inflatable-element outer wall and the inner membrane are arranged such that at least when the inflatable chamber assumes the bulged state, the collapsible membrane portion does not touch the inner surface of the inflatable-element outer wall.

For Some Applications:
 the inner membrane is arranged such that at least when the inflatable chamber is at a gauge pressure of 0.5 atm, the collapsible membrane portion assumes an occluding state, in which the collapsible membrane portion at least partially touches an inner surface of the suction lumen across from the lateral opening, thereby at least partially occluding the suction lumen and modulating a level of suction fluid flow into the suction lumen through the distal-most suction orifice, and
 the inner membrane is arranged such that when the proximal longitudinal portion of the suction lumen is in the fluid communication with the suction source and the suction source provides suction at negative 0.1 atm gauge pressure:
  a first level of suction fluid flow flows through the distal-most suction orifice when the collapsible membrane portion is in the occluding state, a second level of suction fluid flow flows through the distal-most suction orifice when the collapsible membrane portion is in the collapsed state, and the first level of suction is less than 50% of the second level of suction.

For some applications, the proximal longitudinal portion of the suction lumen is coupled in fluid communication with the suction source.

For some applications, the cleaning catheter includes a suction-source connector, which is in fluid communication with the proximal longitudinal portion of the suction lumen, and which is shaped so as to define a male conical fitting with a taper for coupling to the suction source.

For some applications, the taper is at least a 5% taper.

For some applications, the taper is a 6% taper, and the male conical fitting with the 6% taper complies with International Standard ISO 594-1:1986.

There is still further provided, in accordance with an application of the present invention, apparatus for use with a suction source, the apparatus including a cleaning catheter, which includes:

an elongate, tubular catheter body, which is shaped so as to define (a) a distal-most suction orifice, (b) a suction lumen, which (i) is arranged along the catheter body at least partially within the catheter body, and (ii) includes a proximal longitudinal portion that is coupleable in fluid communication with the suction source, and (c) an outer lateral wall, which is shaped so as to define a lateral opening therethrough into the suction lumen, wherein the lateral opening is disposed distal to the proximal longitudinal portion of the suction lumen;

an inflatable element, which includes an inflatable-element outer wall, and is mounted to the catheter body; and an inner membrane, which is at least partially positioned within an interior of the inflatable element and is mounted to the catheter body around the lateral opening along an air-tight seal perimeter that surrounds the lateral opening, so as to define a collapsible membrane portion that covers the lateral opening, and, together with the inflatable-element outer wall, defines an inflatable chamber between the inflatable-element outer wall and the collapsible membrane portion, wherein the inner membrane is arranged such that at least when the inflatable chamber is at ambient pressure, the proximal longitudinal portion of the suction lumen is in fluid communication with the distal-most suction orifice, and wherein when the inflatable chamber is at ambient pressure, the collapsible membrane portion is biased to assume a bulged state, in which the collapsible membrane portion is shaped so as to define a bulge portion having a greatest bulge distance from the seal perimeter of at least 1 mm, measured radially outward or radially inward from the seal perimeter.

For some applications, the greatest bulge distance is at least 1.5 mm.

For some applications, the bulge portion bulges radially outward and not radially inward.

For some applications, the inflatable-element outer wall and the inner membrane are arranged such that at least when the collapsible membrane portion assumes the bulged state, the collapsible membrane portion touches an inner surface of the inflatable-element outer wall.

For some applications, the inflatable-element outer wall and the inner membrane are arranged such that at least when the collapsible membrane portion assumes the bulged state, the collapsible membrane portion does not touch an inner surface of the inflatable-element outer wall.

For some applications, seal perimeter defines a straight distance between two points on the seal perimeter that are most distant from each other, and the inner membrane is arranged such that the collapsible membrane portion has excess material that covers the lateral opening such that a total length of a shortest path along the collapsible membrane portion between the two most distant points on the seal perimeter of the lateral opening equals at least 120% of the straight distance between the two points, at least when the inflatable chamber is at ambient pressure.

For some applications, the shortest path along the collapsible membrane portion equals at least 150% of the straight distance the two points, at least when the inflatable chamber is at ambient pressure.

For some applications, a surface area of the collapsible membrane portion varies by less than 30% between when the inflatable chamber is at ambient pressure and when the inflatable chamber is at a positive gauge pressure of 0.5 atm.

For some applications, the catheter body is shaped so as to define one or more lateral suction orifices, which are located proximal to the inflatable element, and are in fluid communication with the suction lumen.

For some applications, the inflatable element has a greatest diameter of between 6 and 12 mm when inflated at 0.5 atm gauge pressure and unconstrained.

For some applications, at least when the inflatable chamber is at ambient pressure, the collapsible membrane portion is axially surrounded by the inflatable chamber.

For some applications, the inner membrane is arranged such that at least when the inflatable chamber is at a gauge pressure of 0.5 atm, the collapsible membrane portion assumes an occluding state, in which the collapsible membrane portion at least partially touches an inner surface of the suction lumen across from the lateral opening, thereby at least partially occluding the suction lumen and modulating a level of suction fluid flow into the suction lumen through the distal-most suction orifice.

For some applications, the inner membrane entirely surrounds the catheter body.

For some applications, a circumferential portion of the inner membrane snugly touches a circumferential portion of the outer lateral wall of the catheter body, which circumferential portion does not define the lateral opening.

For some applications, the inflatable-element outer wall and the inner membrane are arranged such that at least when the inflatable chamber is at a negative gauge pressure of 0.2 atm, the collapsible membrane portion is crumpled with folds. For some applications, a circumferential portion of the inner membrane snugly touches a circumferential portion of the outer lateral wall of the catheter body, which circumferential portion does not define the lateral opening. For some applications, the circumferential portion of the inner membrane surrounds at least 180 degrees of the catheter body, and the collapsible membrane portion surrounds at least 60 degrees of the catheter body.

For some applications, when the inflatable chamber is at ambient pressure, the collapsible membrane portion touches an inner surface of the inflatable-element outer wall.

For some applications, the inflatable-element outer wall and the inner membrane are arranged such that at least when the inflatable chamber is at a negative gauge pressure of 0.2 atm, the inflatable chamber assumes a collapsed state, in which the collapsible membrane portion only partially touches an inner surface of the inflatable-element outer wall.

For some applications, the inflatable-element outer wall and the inner membrane are arranged such that at least when the inflatable chamber assumes the bulged state, the collapsible membrane portion does not touch the inner surface of the inflatable-element outer wall.

For Some Applications:

the inner membrane is arranged such that at least when the inflatable chamber is at a gauge pressure of 0.5 atm, the collapsible membrane portion assumes an occluding state, in which the collapsible membrane portion at least partially touches an inner surface of the suction lumen across from the lateral opening, thereby at least partially occluding the suction lumen and modulating a level of suction fluid flow into the suction lumen through the distal-most suction orifice, and the inner membrane is arranged such that when the proximal longitudinal portion of the suction lumen is in the fluid communication with the suction source and the suction source provides suction at negative 0.1 atm gauge pressure:
- a first level of suction fluid flow flows through the distal-most suction orifice when the collapsible membrane portion is in the occluding state,
- a second level of suction fluid flow flows through the distal-most suction orifice when the collapsible membrane portion is in the collapsed state, and
- the first level of suction is less than 50% of the second level of suction.

For some applications, the proximal longitudinal portion of the suction lumen is coupled in fluid communication with the suction source.

For some applications, the cleaning catheter includes a suction-source connector, which is in fluid communication with the proximal longitudinal portion of the suction lumen, and which is shaped so as to define a male conical fitting with a taper for coupling to the suction source. For some applications, the taper is at least a 5% taper. For some applications, the taper is a 6% taper, and the male conical fitting with the 6% taper complies with International Standard ISO 594-1:1986.

There is additionally provided, in accordance with an application of the present invention, a method for use with a suction source, the method including:
(1) providing a cleaning catheter, which includes:
an elongate, tubular catheter body, which is shaped so as to define (a) a distal-most suction orifice, and (b) a suction lumen, which (i) is arranged along the catheter body at least partially within the catheter body, and (ii) includes a proximal longitudinal portion that is coupleable in fluid communication with the suction source, and (c) an outer lateral wall, which is shaped so as to define a lateral opening therethrough into the suction lumen, wherein the lateral opening is disposed distal to the proximal longitudinal portion of the suction lumen;
an inflatable element, which includes an inflatable-element outer wall, and is mounted to the catheter body; and
an inner membrane, which is at least partially positioned within an interior of the inflatable element and is mounted to the catheter body around the lateral opening along an air-tight seal perimeter that surrounds the lateral opening, so as to define a collapsible membrane portion that covers the lateral opening, and, together with the inflatable-element outer wall, defines an inflatable chamber between the inflatable-element outer wall and the collapsible membrane portion,
wherein the inner membrane entirely surrounds the catheter body, and wherein the inner membrane is arranged such that:
(a) at least when the inflatable chamber is at ambient pressure, the proximal longitudinal portion of the suction lumen is in fluid communication with the distal-most suction orifice, and
(b) at least when the inflatable chamber is at a gauge pressure of 0.5 atm, the collapsible membrane portion assumes an occluding state, in which the collapsible membrane portion at least partially touches an inner surface of the suction lumen across from the lateral opening, thereby at least partially occluding the suction lumen and modulating a level of suction fluid flow into the suction lumen through the distal-most suction orifice;
(2) inserting the cleaning catheter into a tracheal ventilation tube; and
(3) applying positive pressure of between 0.2 atm and 2 atm to the inflatable chamber such that the collapsible membrane portion assumes the occluding state.

There is yet additionally provided, in accordance with an application of the present invention, a method for use with a suction source, the method including:
(1) providing a cleaning catheter, which includes:
an elongate, tubular catheter body, which is shaped so as to define (a) a distal-most suction orifice, and (b) a suction lumen, which (i) is arranged along the catheter body at least partially within the catheter body, and (ii) includes a proximal longitudinal portion that is coupleable in fluid communication with the suction source, and (c) an outer lateral wall, which is shaped so as to define a lateral opening therethrough into the suction lumen, wherein the lateral opening is disposed distal to the proximal longitudinal portion of the suction lumen;
an inflatable element, which includes an inflatable-element outer wall, and is mounted to the catheter body; and
an inner membrane, which is at least partially positioned within an interior of the inflatable element and is mounted to the catheter body around the lateral opening along an air-tight seal perimeter that surrounds the lateral opening, so as to define a collapsible membrane portion that covers the lateral opening, and, together with the inflatable-element outer wall, defines an inflatable chamber between the inflatable-element outer wall and the collapsible membrane portion, wherein the seal perimeter defines a straight distance between two points on the seal perimeter that are most distant from each other,
wherein the inner membrane is arranged such that:
(a) the collapsible membrane portion has excess material that covers the lateral opening such that a total length of a shortest path along the collapsible membrane portion between the two most distant points on the seal perimeter of the lateral opening equals at least 120% of the straight distance between the two points, at least when the inflatable chamber is at ambient pressure,
(b) at least when the inflatable chamber is at ambient pressure, the proximal longitudinal portion of the suction lumen is in fluid communication with the distal-most suction orifice, and
(c) at least when the inflatable chamber is at a gauge pressure of 0.5 atm, the collapsible membrane portion assumes an occluding state, in which the collapsible membrane portion at least partially touches an inner surface of the suction lumen across from the lateral opening, thereby at least partially occluding the suction lumen and modulating a level of suction fluid flow into the suction lumen through the distal-most suction orifice;
(2) inserting the cleaning catheter into a tracheal ventilation tube; and
(3) applying positive pressure of between 0.2 atm and 2 atm to the inflatable chamber such that the collapsible membrane portion assumes the occluding state.

For some applications, the shortest path along the collapsible membrane portion equals at least 150% of the straight distance the two points, at least when the inflatable chamber is at ambient pressure.

For some applications, a surface area of the collapsible membrane portion varies by less than 30% between when the inflatable chamber is at ambient pressure and when the inflatable chamber is at a positive gauge pressure of 0.5 atm.

For some applications, the catheter body is shaped so as to define one or more lateral suction orifices, which are located proximal to the inflatable element, and are in fluid communication with the suction lumen.

For some applications, at least one of the one or more lateral suction orifices are located within 3 cm of the inflatable element, measured along a central longitudinal axis of the suction lumen.

For some applications, the inflatable element is mounted to the catheter body at a location within 5 cm of a distal end of the catheter body.

For some applications, the inflatable element has a greatest diameter of between 6 and 12 mm when inflated at 0.5 atm gauge pressure and unconstrained.

For some applications, an axial length of the lateral opening, measured parallel to a central longitudinal axis of the suction lumen, equals between 100% and 300% of a largest diameter of a cross-section of the suction lumen perpendicular to the central longitudinal axis.

For some applications, the catheter body is shaped so as to define exactly one suction lumen.

For some applications, the method further includes providing a pliable sleeve around at least a portion of the catheter body to inhibit contamination.

For some applications, at least when the inflatable chamber is at ambient pressure, the collapsible membrane portion is axially surrounded by the inflatable chamber.

For some applications, at least a portion of an edge of the seal perimeter closest to the lateral opening is disposed at a distance from a perimeter of the lateral opening, the distance measured in one or more directions other than radially.

For some applications, the inner membrane is arranged such that the collapsible membrane portion assumes the occluding state at least when the gauge pressure is 0.2 atm.

For some applications, the inner membrane is arranged such that the collapsible membrane portion assumes the occluding state at least when the gauge pressure is 0.1 atm.

For some applications, the inner membrane entirely surrounds the catheter body.

For some applications, a circumferential portion of the inner membrane snugly touches a circumferential portion of the outer lateral wall of the catheter body, which circumferential portion does not define the lateral opening.

For some applications, the inflatable-element outer wall and the inner membrane are arranged such that at least when the inflatable chamber is at a negative gauge pressure of 0.2 atm, the collapsible membrane portion is crumpled with folds. For some applications, a circumferential portion of the inner membrane snugly touches a circumferential portion of the outer lateral wall of the catheter body, which circumferential portion does not define the lateral opening. For some applications, the circumferential portion of the inner membrane surrounds at least 180 degrees of the catheter body, and the collapsible membrane portion surrounds at least 60 degrees of the catheter body.

For some applications, when the inflatable chamber is at ambient pressure, the collapsible membrane portion is biased to assume a bulged state, in which the collapsible membrane portion is shaped so as to define a bulge portion having a greatest bulge distance from the seal perimeter of at least 1 mm, measured radially outward or radially inward from the seal perimeter.

For some applications, the greatest bulge distance is at least 1.5 mm.

For some applications, the bulge portion bulges radially outward and not radially inward.

For some applications, the inflatable-element outer wall and the inner membrane are arranged such that at least when the collapsible membrane portion assumes the bulged state, the collapsible membrane portion touches an inner surface of the inflatable-element outer wall.

For some applications, the inflatable-element outer wall and the inner membrane are arranged such that at least when the collapsible membrane portion assumes the bulged state, the collapsible membrane portion does not touch an inner surface of the inflatable-element outer wall.

For some applications, when the inflatable chamber is at ambient pressure, the collapsible membrane portion touches an inner surface of the inflatable-element outer wall.

For some applications, the inflatable-element outer wall and the inner membrane are arranged such that at least when the inflatable chamber is at a negative gauge pressure of 0.2 atm, the inflatable chamber assumes a collapsed state, in which the collapsible membrane portion only partially touches an inner surface of the inflatable-element outer wall.

For some applications, when the inflatable chamber is at ambient pressure, the collapsible membrane portion is biased to assume a bulged state, in which the collapsible membrane portion is shaped so as to define a bulge portion having a greatest bulge distance from the seal perimeter of at least 1 mm, measured radially outward or radially inward from the seal perimeter.

For some applications, the inflatable-element outer wall and the inner membrane are arranged such that at least when the inflatable chamber assumes the bulged state, the collapsible membrane portion does not touch the inner surface of the inflatable-element outer wall.

For some applications, the inner membrane is arranged such that when the proximal longitudinal portion of the suction lumen is in the fluid communication with the suction source and the suction source provides suction at negative 0.1 atm gauge pressure:

a first level of suction fluid flow flows through the distal-most suction orifice when the collapsible membrane portion is in the occluding state, a second level of suction fluid flow flows through the distal-most suction orifice when the collapsible membrane portion is in the collapsed state, and the first level of suction is less than 50% of the second level of suction.

For some applications, the proximal longitudinal portion of the suction lumen is coupled in fluid communication with the suction source.

For some applications, the cleaning catheter includes a suction-source connector, which is in fluid communication with the proximal longitudinal portion of the suction lumen, and which is shaped so as to define a male conical fitting with a taper for coupling to the suction source.

For some applications, the taper is at least a 5% taper.

For some applications, the taper is a 6% taper, and the male conical fitting with the 6% taper complies with International Standard ISO 594-1:1986.

There is also provided, in accordance with an application of the present invention, a method for use with a suction source, the method including:

(1) providing a cleaning catheter, which includes:
  an elongate, tubular catheter body, which is shaped so as to define (a) a distal-most suction orifice, and (b) a suction lumen, which (i) is arranged along the catheter body at least partially within the catheter body, and (ii) includes a proximal longitudinal portion that is coupleable in fluid communication with the suction source, and (c) an outer lateral wall, which is shaped so as to define a lateral opening therethrough into the suction lumen, wherein the lateral opening is disposed distal to the proximal longitudinal portion of the suction lumen;
  an inflatable element, which includes an inflatable-element outer wall, and is mounted to the catheter body; and
  an inner membrane, which is at least partially positioned within an interior of the inflatable element and is mounted to the catheter body around the lateral opening along an air-tight seal perimeter that surrounds the lateral opening, so as to define a collapsible membrane portion that covers the lateral opening, and, together with the inflatable-element outer wall, defines an inflatable chamber between the inflatable-element outer wall and the collapsible membrane portion,
  wherein when the inflatable chamber is at ambient pressure, the collapsible membrane portion is biased to assume a bulged state, in which the collapsible membrane portion is shaped so as to define a bulge portion having a greatest bulge distance from the seal perimeter of at least 1 mm, measured radially outward or radially inward from the seal perimeter, and
  wherein the inner membrane is arranged such that:
    (a) at least when the inflatable chamber is at ambient pressure, the proximal longitudinal portion of the suction lumen is in fluid communication with the distal-most suction orifice, and
    (b) at least when the inflatable chamber is at a gauge pressure of 0.5 atm, the collapsible membrane portion assumes an occluding state, in which the collapsible membrane portion at least partially touches an inner surface of the suction lumen across from the lateral opening, thereby at least partially occluding the suction lumen and modulating a level of suction fluid flow into the suction lumen through the distal-most suction orifice;
(2) inserting the cleaning catheter into a tracheal ventilation tube; and
(3) applying positive pressure of between 0.2 atm and 2 atm to the inflatable chamber such that the collapsible membrane portion assumes the occluding state.

For some applications, the greatest bulge distance is at least 1.5 mm.

For some applications, the bulge portion bulges radially outward and not radially inward.

The present invention will be more fully understood from the following detailed description of embodiments thereof, taken together with the drawings, in which:

BRIEF DESCRIPTION OF THE DRAWINGS

FIGS. 3A-D are schematic illustrations of a distal portion of a cleaning catheter of the cleaning system of FIG. 1, in accordance with an application of the present invention;

DETAILED DESCRIPTION OF APPLICATIONS

Figure 1:
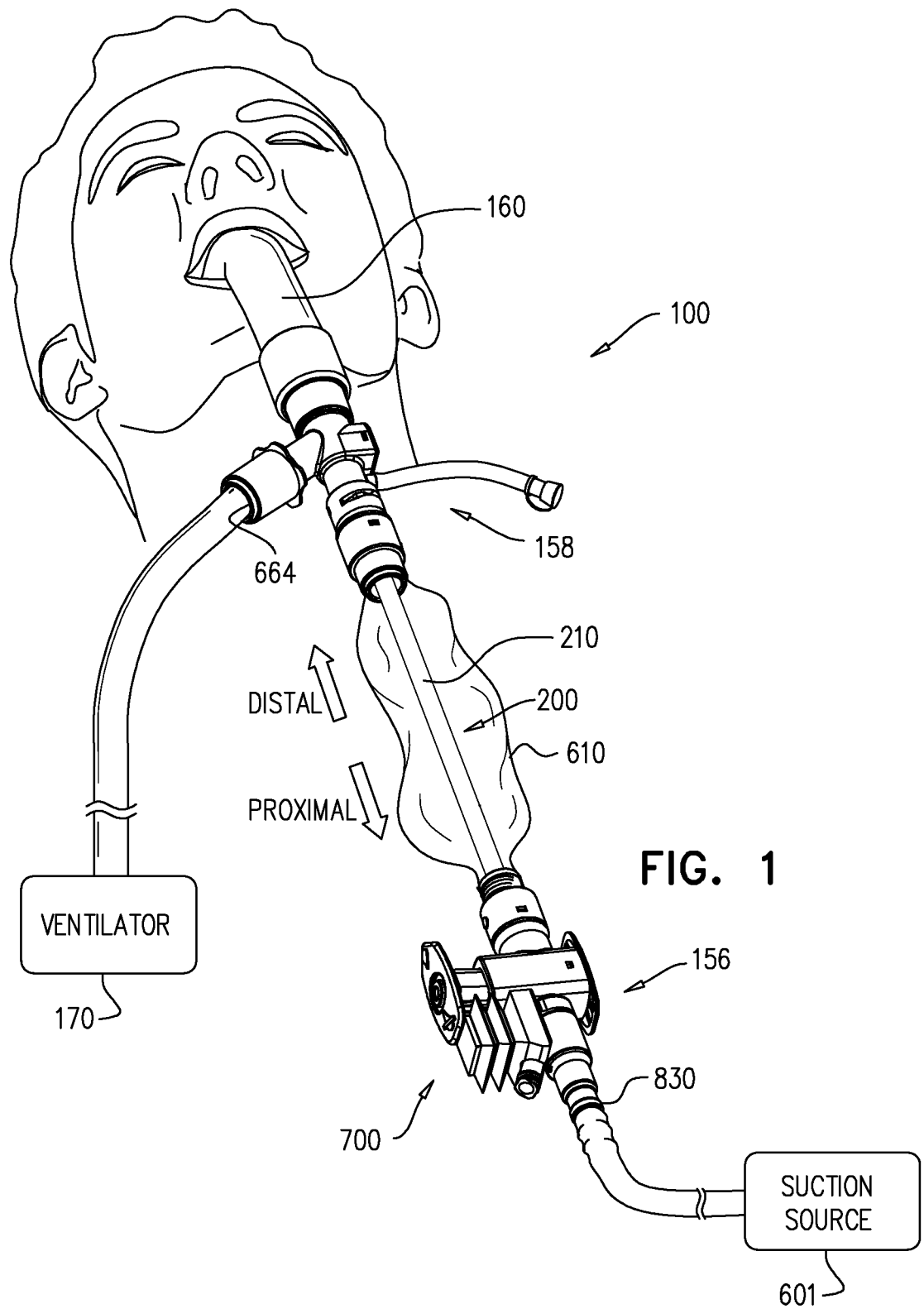
FIG. 1 is a schematic illustration of a closed suction cleaning system, in accordance with an application of the present invention.

FIG. 1 is schematic illustration of a closed suction cleaning system 100, in accordance with an application of the present invention. Cleaning system 100 is configured for use with a tracheal ventilation tube 160, a ventilator 170, and a suction source 601. For some applications, cleaning system 100 comprises one or more of tracheal ventilation tube 160, ventilator 170, and/or suction source 601, in any combination.

As used in the present application, including in the claims, a "tracheal ventilation tube" comprises an endotracheal tube (ETT) or a tracheostomy tube. Suction source 601 provides a negative pressure (less than ambient atmospheric pressure). As used in the present application, including in the claims, a "fluid" comprises liquid and/or gas, for example, a liquid-gas mixture that is predominantly liquid, such as a liquid with gas bubbles. The liquid may comprise water, such as saline solution or a disinfectant solution.

Figure 2:
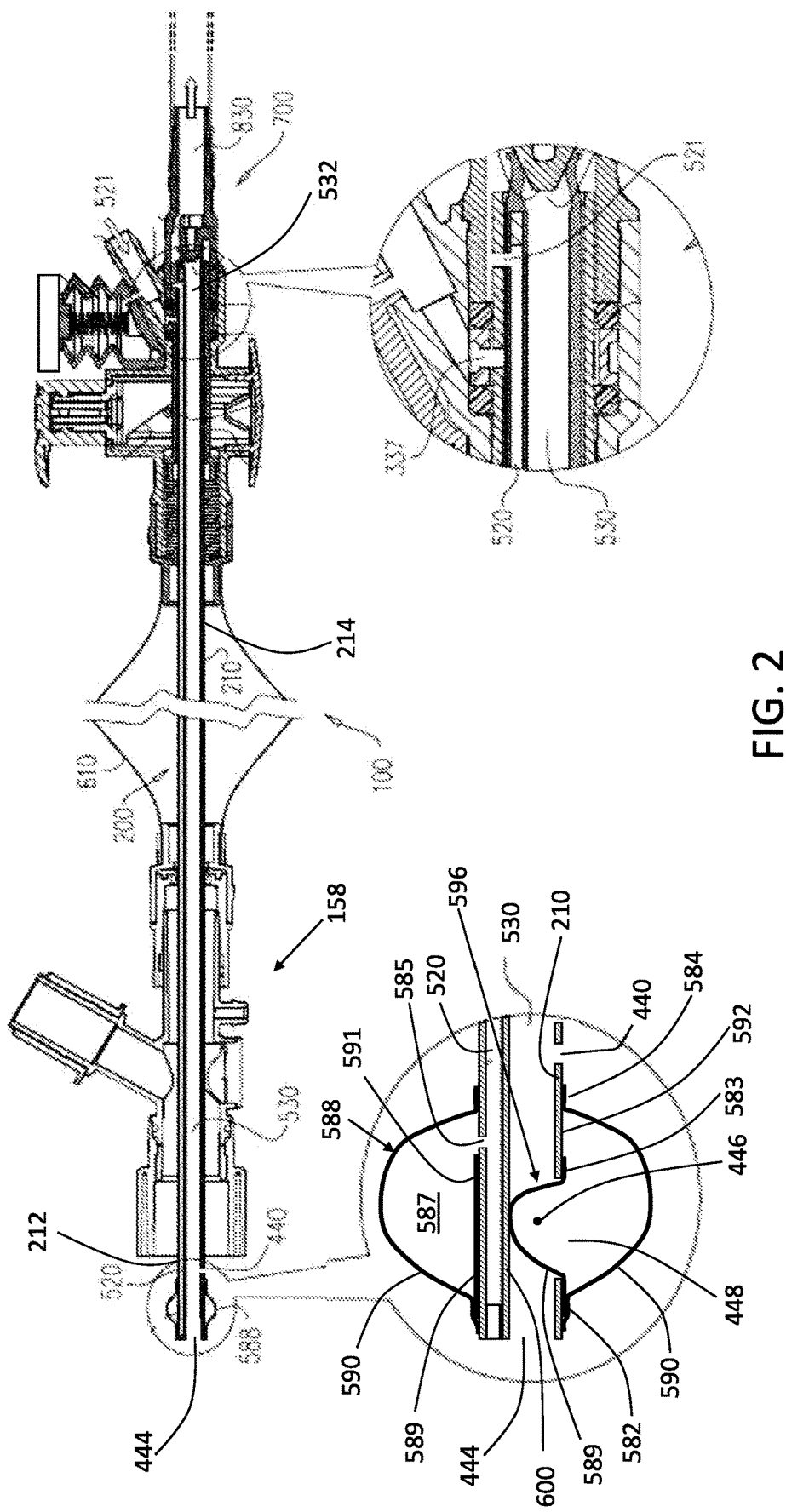
FIG. 2 is a schematic illustration of a cross-section of the closed suction cleaning system of FIG. 1, in accordance with an application of the present invention.

Reference is still made to FIG. 1, and is additionally made to FIG. 2, which is a schematic cross-sectional view of cleaning system 100, in accordance with an application of the present invention. Cleaning system 100 comprises a distal ventilation tube-connector assembly 158, a cleaning catheter 200, and an input module 156. Cleaning catheter 200 comprises an elongate, flexible, tubular catheter body 210. As shown in FIG. 2, cleaning catheter 200 includes a distal portion 212 located distal to ventilation tube-connector assembly 158, and a proximal portion 214 located proximal to ventilation tube-connector assembly 158. Distal portion 212 is configured to be inserted into tracheal ventilation tube 160. Proximal portion 214 includes a proximal-most input portion of catheter body 210, which is configured to be inserted into or is disposed within input module 156. For some applications, cleaning system 100 comprises a substantially impermeable and/or pliable sleeve 610 around at least a portion of catheter body 210, for inhibiting contamination and protecting an outer surface of catheter body 210.

Cleaning catheter 200 further comprises an inflatable element 588, such as a balloon, which comprises an inflatable-element outer wall 590 and is mounted to catheter body 210 with an air-tight seal 584, typically near a distal end of catheter body 210, e.g., within 5, e.g., with 3 cm, such as within 1 cm, of the distal end, and/or in a distal half of distal portion 212 of cleaning catheter 200, such as a distal third, a distal fifth, or a distal tenth of distal portion 212. Alternatively or additionally, inflatable element 588 is mounted to a distal portion of catheter body 210, such as within 3 cm, e.g., within 1 cm, of a distal-most suction orifice 444, described hereinbelow. For some applications, at least a portion 582 of air-tight seal 584 is in contact with a portion of an inner membrane 589, described below, that itself is attached to outer lateral wall 592 of catheter body 210 on one side and to the material of inflatable element 588 overlaid on the other side.

Inflatable element 588 is inflatable into contact with an inner surface of ventilation tube 160. For some applications, inflatable element 588 has a greatest diameter of between 6 and 12 mm when inflated at 0.5 atm gauge pressure and unconstrained (i.e., not constrained by the ventilation tube or anything else), which is typically slightly greater than an inner diameter of ventilation tube 160, in order to provide sealing contact with the inner surface of the ventilation tube. For some applications, inflatable element 588 has a volume of at least 0.2 cc, no more than 0.8 cc, and/or between 0.2 and 0.8 cc when inflated at 0.5 atm gauge pressure and unconstrained. For some applications, inflatable element 588 is elastic, while for other applications inflatable element 588 is not elastic. For some applications, inflatable element 588 comprises a thin pliable material, such that inflatable element 588 crumples when deflated.

Catheter body 210 further comprises one or more fluid-delivery inflation lumens 520, which provide fluid communication between at least one inflation inlet 521 and at least one inflation port 585 which is in fluid communication with inflatable chamber 587 of inflatable element 588, described hereinbelow.

Catheter body 210 is shaped so as to define a suction lumen 530 (e.g., exactly one suction lumen 530). Suction lumen 530 is arranged along catheter body 210 at least partially within catheter body 210, and includes a proximal longitudinal portion 532, which is coupleable (e.g., coupled) in fluid communication with suction source 601. For some applications, cleaning catheter 200 comprises a suction-source connector 830 (labeled in FIG. 2), which is in fluid communication with proximal longitudinal portion 532 of suction lumen 530, and which is shaped so as to define a male conical fitting with a taper for coupling to suction source 601. Typically, the taper is at least a 5% taper. For example, the taper may be a 6% taper, and the male conical fitting with the 6% taper may comply with International Standard ISO 594-1:1986.

Catheter body 210 is also shaped so as to define distal-most suction orifice 444 distal to inflatable element 588, typically at a distal end of distal portion 212 of cleaning catheter 200. Distal-most suction orifice 444 is in fluid communication with a distal portion of suction lumen 530. For some applications, distal-most suction orifice 444 is defined by a distal tip of the cleaning catheter (as shown), while for other applications distal-most suction orifice 444 is defined by a lateral wall of the cleaning catheter distal to inflatable element 588 (configuration not shown). Distal-most suction orifice 444 enables cleaning system 100 to selectively apply suction to the trachea. The techniques described hereinbelow with reference to FIGS. 1-5 allow cleaning system 100 to modulate suction provided from distal-most suction orifice 444 distal to inflatable element 588, relative to the suction provided to the lateral suction orifices 440. The techniques include modulating occlusion of suction lumen 530, at an axial location at which inflatable element 588 is positioned. In configurations in which lateral suction orifices 440 are provided, the axial location is proximal to distal-most suction orifice 444, and longitudinally between distal-most suction orifice 444 and the one or more lateral suction orifices 440.

Catheter body 210 is shaped so as to define an outer lateral wall 592, which is shaped so as to define a lateral opening 448 therethrough into suction lumen 530. Lateral opening 448 is disposed distal to proximal longitudinal portion 532 of suction lumen 530. For some applications, an axial length L of lateral opening 448 (labeled in FIG. 3D), measured parallel to a central longitudinal axis 533 of suction lumen 530, equals between 100% and 300% of a largest diameter of a cross-section of suction lumen 530 perpendicular to central longitudinal axis 533. As used in the present application, including in the claims, a "longitudinal central axis" of an elongate structure is the set of all centroids of cross-sectional sections of the structure along the structure. Thus the cross-sectional sections are locally perpendicular to the central longitudinal axis, which runs along the structure. Suction lumen 530 is not necessarily circular in cross-section; in configurations in which suction lumen 530 is not circular in cross-section, the "largest diameter" of the cross-section of suction lumen 530 is the length of a straight line from one side of the cross-section to the other side of the cross-section that passes through the centroid of the cross-section. As used in the present application, including in the claims, "axial" and "axially" mean along an axis, and do not mean around or about an axis.

Cleaning catheter 200 further comprises an inner membrane 589, which is at least partially positioned within an interior of inflatable element 588 and is mounted (fixed to, e.g., by gluing or welding) to catheter body 210 around lateral opening 448 along an air-tight seal perimeter 583 that surrounds lateral opening 448, so as to define a collapsible membrane portion 596 that covers lateral opening 448. In other words, collapsible membrane portion 596 is the portion of inner membrane 589 within a border defined by seal perimeter 583, and does not include (a) the portion of inner membrane 589 fixed to catheter body 210, or (b) any portions of inner membrane 589 that may be provided outside of the seal perimeter 583. Together with inflatable-element outer wall 590, collapsible membrane portion 596 defines an inflatable chamber 587 between inflatable-element outer wall 590 and collapsible membrane portion 596. Seal perimeter 583 defines a straight distance D between two points 598A and 598B on seal perimeter 583 that are most distant from each other (labeled in FIG. 3D). For some applications, seal perimeter 583 is flush with the perimeter of lateral opening 448 (as shown), while for other applications at least a portion of an edge of seal perimeter 583 closest to lateral opening 448 is disposed at a distance from a perimeter of lateral opening 448, the distance measured in one or more directions other than radially (configuration not shown).

Typically, inner membrane 589 comprises a material that is thinner than a material of the wall of inflatable element 588, such as less than 70%, e.g., less than 50%, such as less than 30%, of a thickness of the material of inflatable-element outer wall 590. Inflatable-element outer wall 590 and inner membrane 589 may comprise the same type of material or different types of materials.

For some applications, catheter body 210 is shaped to additionally define one or more lateral suction orifices 440, which are located proximal to inflatable element 588, and are in fluid communication with suction lumen 530. Each of lateral suction orifices 440 is defined by an opening extending through outer lateral wall 592 of catheter body 210 into suction lumen 530 at an axial location proximal to inflatable element 588. For some applications, at least one of lateral suction orifices 440 (such as all of the one or more lateral suction orifices 440) is near inflatable element 588, such as within 3 cm, such as within 1 cm, e.g., within 0.5 cm, of inflatable element 588, measured along central longitudinal axis 533 of suction lumen 530. For some applications, lateral suction orifices 440 have a total cross-sectional area in aggregate of at least 2 mm2, no more than 25 mm2, and/or between 2 and 25 mm2, such as at least 4 mm2, no more than 16 mm2, and/or between 4 and 16 mm2.

Lateral suction orifices 440 are supplied with negative pressure by suction source 601 and facilitate cleaning of the inner surface of ventilation tube 160. For some applications, material within the interior of ventilation tube 160 may be suctioned into lateral suction orifices 440 and proximally transported out of ventilation tube 160, e.g., to a location that is proximal to ventilation tube-connector assembly 158. Fluid communication between suction source 601 and lateral suction orifices 440 may be provided by one or more connecting lumens within or along catheter body 210. As used in the present application, including in the claims, "fluid communication" includes both positive and negative pressure fluid communication, and thus includes, for example, communication of a positive pressure or of a suction force.

Reference is now made to FIGS. 3A-D, which are schematic illustrations of distal portion 212 of cleaning catheter 200, in accordance with an application of the present invention. FIG. 3B is a cross-sectional view perpendicular to central longitudinal axis 533 of suction lumen 530 taken along a plane 10 which passes through an axial center 11 of lateral opening 448.

For some applications, inner membrane 589 is arranged such that:
collapsible membrane portion 596 has excess material that covers lateral opening 448 such that a total length of a shortest path along collapsible membrane portion 596 between the two most distant points 598A and 598B on seal perimeter 583 of lateral opening 448 (labeled in FIG. 3D) equals at least 120% (e.g., at least 150%) of the straight distance D between the two most distant points 598A and 598B (labeled in FIG. 3D), at least when inflatable chamber 587 is at ambient pressure (i.e., at zero gauge pressure), such as shown in FIGS. 3A and 3B,
at least when inflatable chamber 587 is at ambient pressure, such as shown in FIGS. 3A and 3B, proximal longitudinal portion 532 of suction lumen 530 is in fluid communication with distal-most suction orifice 444, and
at least when inflatable chamber 587 is at a gauge pressure of 0.5 atm, such as shown in FIG. 3C, collapsible membrane portion 596 assumes an occluding state, in which collapsible membrane portion 596 extends through lateral opening 448 into suction lumen 530 and at least partially touches an inner surface 600 of suction lumen 530 across from lateral opening 448, thereby at least partially occluding suction lumen 530 and modulating a level of suction fluid flow into suction lumen 530 through distal-most suction orifice 444. In other words, when inflatable element 588 is inflated via inflation port 585, the inflation also causes inflation and expansion of inflatable chamber 587 and of collapsible membrane portion 596 into suction lumen 530, so as to at least partially occlude the passage between distal-most suction orifice 444 (which is distal to inflatable element 588) and the one or more lateral suction orifices 440 (which are proximal to inflatable element 588), thereby modulating a level of suction delivered to distal-most suction orifice 444 via suction lumen 530.

Such partial occlusion also inhibits fluid communication between the one or more lateral suction orifices 440 and distal-most suction orifice 444 through suction lumen 530.

For some applications, inner membrane 589 is arranged such that collapsible membrane portion 596 assumes the occluding state at least when the gauge pressure is 0.2 atm. For some applications, inner membrane 589 is arranged such that collapsible membrane portion 596 assumes the occluding state at least when the gauge pressure is 0.1 atm.

For some applications, when collapsible membrane portion 596 is in the occluding state, the fluid suction flow through distal-most suction orifice 444 is at least 50% less than (e.g., at least 75% less than, such as at least 90% less than, e.g., at least 99% less than) when suction lumen 530 is not occluded by collapsible membrane portion 596, when suction lumen 530 is connected to a suction source 601 of the same power.

FIGS. 3A and 3B show a configuration of a resting state of collapsible membrane portion 596, in which inflatable chamber 587 is at ambient pressure (i.e., no inflation pressure and no deflation suction is applied to the one or more fluid-delivery inflation lumens 520). For some applications, such as shown in FIGS. 3A and 3B, when inflatable chamber 587 is at ambient pressure, collapsible membrane portion 596 is biased to assume a bulged state, in which collapsible membrane portion 596 is shaped so as to define a bulge portion 602 having a greatest bulge distance $D_B$ from seal perimeter 583 of at least 1 mm (e.g., at least 1.5 mm, such as at least 2 mm), measured radially outward (as shown) or radially inward (configuration not shown) from seal perimeter 583. For some applications, bulge portion 602 bulges radially outward and not radially inward (as shown), while for other applications, bulge portion 602 bulges radially inward and not radially outward (configuration not shown). As used in the present application, including in the claims, "radially outward" means away from central longitudinal axis 533 of suction lumen 530 and "radially inward" means toward central longitudinal axis 533 of suction lumen 530. For some applications, such as shown in FIGS. 3A and 3B, the resting surface height of inflatable-element outer wall 590 is high enough to accommodate the full extent of the collapsible membrane bulge portion 602 (in contrast with the configuration described hereinbelow with reference to FIG. 6C).

Typically, inflatable-element outer wall 590 and inner membrane 589 are arranged such that at least when inflatable chamber 587 assumes the bulged state, collapsible membrane portion 596 does not touch an inner surface 604 of inflatable-element outer wall 590 (and also does not touch inner surface 600 of suction lumen 530) (as mentioned above, for some applications, bulge portion 602 bulges radially outward (as shown), while for other applications, bulge portion 602 bulges radially inward (configuration not shown)). For example, for configurations in which bulge portion 602 bulges radially outward (as shown), inflatable-element outer wall 590 and inner membrane 589 may be arranged such that when inflatable chamber 587 assumes the bulged state, greatest bulge distance $D_B$ is at least 20% less than a greatest inflatable-element-outer-wall distance $D_W$ from seal perimeter 583, measured radially outward from seal perimeter 583.

FIG. 3C shows the occluding state of collapsible membrane portion 596, in which positive gauge pressure (greater than ambient atmospheric pressure) is applied through the one or more fluid-delivery inflation lumens 520. For example, the positive gauge pressure may be a gauge pressure of 0.5 atm, such as 0.2 atm, e.g., 0.1 atm. For some applications in which collapsible membrane portion 596 is biased to define bulge portion 602 when inflatable chamber 587 is at ambient pressure, as described above, collapsible membrane portion 596 inverts when in the occluding state, as shown in FIG. 3C. In some applications, inflatable element 588 expands only slightly upon inflation, i.e., it has a resting diameter that is similar to the tracheal tube diameter. More generally, in some other applications, the resting diameter of inflatable element 588 is less than the diameter of tracheal ventilation tube 160 and greater than the diameter of catheter body 210.

For some applications, both when inflatable chamber 587 is at ambient pressure (i.e., collapsible membrane portion 596 is in the resting state, as shown in FIGS. 3A-B) and inflatable chamber 587 is at positive gauge pressure (i.e., in the occluding state, as shown in FIG. 3C), collapsible membrane portion 596 is axially surrounded by inflatable chamber 587, i.e., inflatable chamber 587 extends both distally and proximally beyond collapsible membrane portion 596. In addition, for some applications, lateral opening 448 is axially surrounded by inflatable chamber 587.

In some applications, because of the greatest bulge distance $D_B$ and the structure of collapsible membrane portion 596 in the resting state, collapsible membrane portion 596 does not need to stretch much or at all in order to come into contact with inner surface 600 of suction lumen 530 in order to at least partially occlude suction lumen 530. Moreover, because of the greatest bulge distance $D_B$ and the structure of collapsible membrane portion 596 in the resting state, occlusion of suction lumen 530 is not very sensitive to the inflation pressure. For example, providing only 0.2 atm inflation gauge pressure may be sufficient to cause collapsible membrane portion 596 to come into contact with inner surface 600 of suction lumen 530 in order to at least partially occlude suction lumen 530. In order to maximize occlusion of suction lumen 530, collapsible membrane portion 596 typically penetrates deeply enough into suction lumen 530 across central longitudinal axis 533 so as to touch the full perimeter of inner surface 600 of suction lumen 530 at at least one axial location alongside lateral opening 448.

Figure 5:
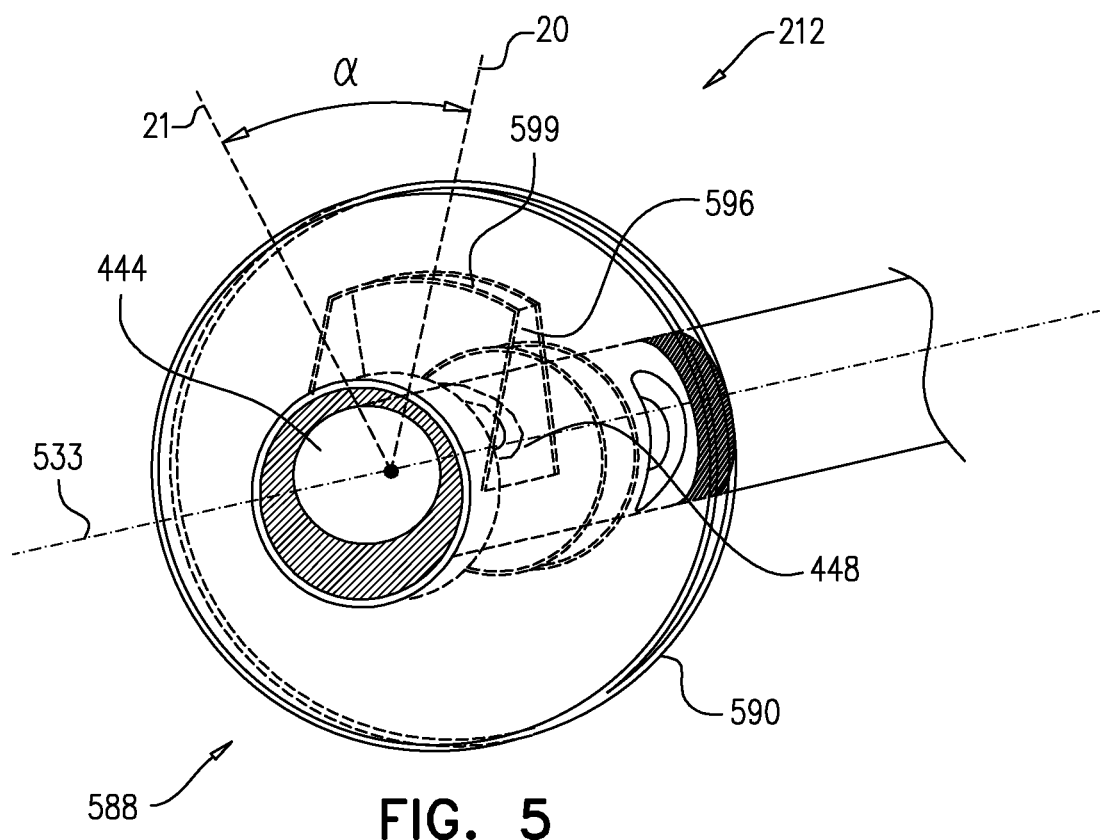
FIG. 5 is a schematic illustration of the distal portion of the cleaning catheter of FIGS. 4A-B, in accordance with an application of the present invention.

As illustrated in FIGS. 3B and 3C, the bulge area of inner membrane 589 is characterized by the area in which inner membrane 589 does not touch catheter body 210 when collapsible membrane portion 596 is in the resting state. A bulge area portion 599 includes a location having a height h measured radially outwards along a radial line 20 from axial center 11 of lateral opening 448. Going around the catheter, bulge area portion 599 ends where inner membrane 589 comes into contact with the catheter body 210. Therefore, there is an intermediate point where inner membrane 589 has a second height h2, measured radially outwards along a radial line 21 from axial center 11, which second height h2 equals half the height h, i.e., h2=h/2. An angle $\alpha$ between line 20 and line 21 is an angular window of bulge portion 602. Typically, angle $\alpha$ is less than 60 degrees. For example, such as illustrated in FIG. 5, angle $\alpha$ may be less than 45 degrees or less than 30 degrees.

FIG. 3D shows inflatable chamber 587 in a collapsed state. For some applications, such as shown in FIG. 3D, inflatable-element outer wall 590 and inner membrane 589 are arranged such that at least when inflatable chamber 587 is at a negative gauge pressure of 0.2 atm, inflatable chamber 587 assumes a collapsed state, in which collapsible membrane portion 596 is drawn at least partially (e.g., so that collapsible membrane portion 596 does not cross central longitudinal axis 533 of suction lumen 530), such as entirely, out of suction lumen 530 and only partially touches inner surface 604 of inflatable-element outer wall 590 (e.g., touches less than 90%, such as less than 80%, e.g., less than 70%, of inner surface 604). The occlusion of suction lumen 530 is thus reversible. Because of the excess surface area of collapsible membrane portion 596, collapsible membrane portion 596 is typically crumpled with folds.

Typically, a surface area of collapsible membrane portion 596 varies by less than 30% (e.g., less than 20%, such as less than 10% or less than 5%) between when inflatable chamber 587 is at ambient pressure, such as shown in FIGS. 3A and 3B, and when inflatable chamber 587 is at a positive gauge pressure of 0.5 atm, such as shown in FIG. 3C.

For some applications, inner membrane 589 is arranged such that when proximal longitudinal portion 532 of suction lumen 530 is in the fluid communication with suction source 601 and suction source 601 provides suction at negative 0.1 atm gauge pressure:
  a first level of suction fluid flow flows through distal-most suction orifice 444 when collapsible membrane portion 596 is in the occluding state,
  a second level of suction fluid flow flows through distal-most suction orifice 444 when collapsible membrane portion 596 is in the collapsed state, and
  the first level of suction is less than 50% of the second level of suction, such as at least 75% less, e.g., at least 90% less.

Figure 4A:
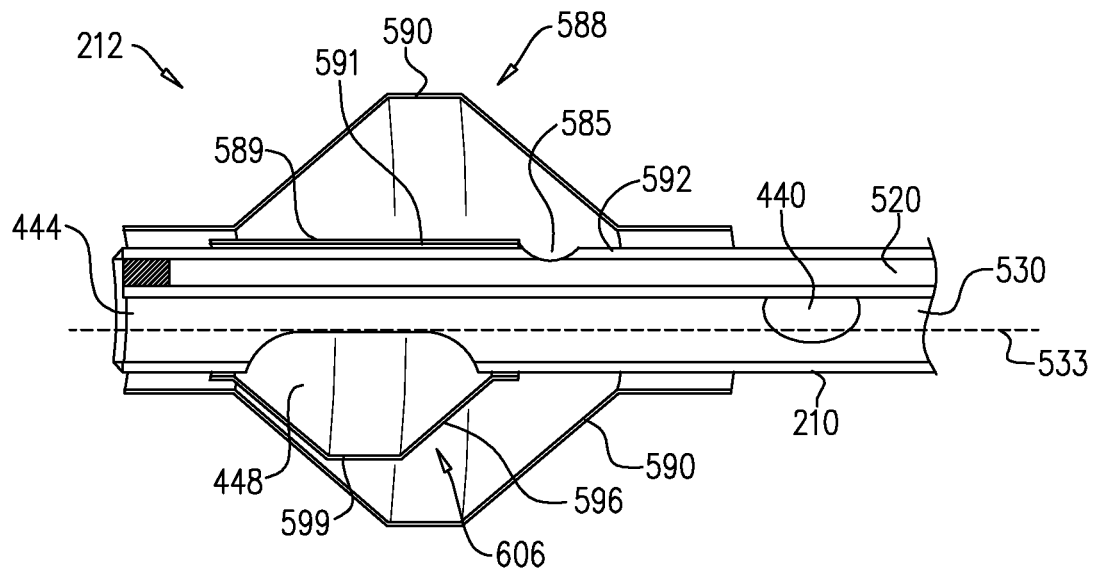
FIGS. 4A-B are schematic illustrations of a distal portion of a cleaning catheter of the cleaning system of FIG. 1, in accordance with an application of the present invention.
Figure 4B:
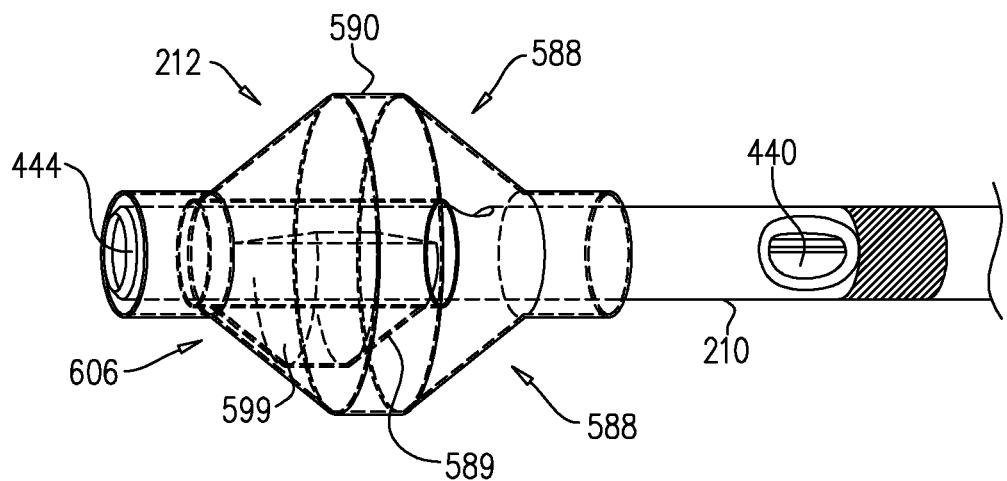

Reference is made to FIGS. 4A-B and 5, which are schematic illustrations of distal portion 212 of cleaning catheter 200, in accordance with an application of the present invention. In this configuration, inner membrane 589 comprises a tube 606 that has (a) a central portion that does not have cylindrical symmetry and/or has an anisotropic shape, and (b) proximal and distal portions proximally and distally beyond collapsible membrane portion 596 that have cylindrical symmetry. Typically, a circumferential portion 591 of inner membrane 589 snugly touches a circumferential portion of outer lateral wall 592 of catheter body 210 (e.g., which circumferential portion does not define lateral opening 448), and bulge portion 602 bulges radially outward from catheter body 210. Inner membrane 589 is positioned and oriented such that collapsible membrane portion 596 covers lateral opening 448.

Reference is made to FIGS. 2, 3A-D, 4A-B, and 5. In some applications, inner membrane 589 entirely surrounds catheter body 210; for example, inner membrane 589 may comprise tube 606 that has (a) a central portion that does not have cylindrical symmetry, and (b) proximal and distal portions proximally and distally beyond collapsible membrane portion 596 that have cylindrical symmetry, such as described hereinabove with reference to FIGS. 4A-B and 5. Forming inner membrane 589 from tube 606 may substantially simplify manufacturing of cleaning catheter 200 compared to manufacturing collapsible membrane portion 596 from a non-tubular piece of material and attaching (e.g., gluing) it to seal perimeter 583. For example, tube 606 may be initially entirely cylindrical, and then the central portion of tube 606 may be deformed to define collapsible membrane portion 596 (e.g., bulge portion 602), while leaving the proximal and distal portions of tube 606 cylindrical. Tube 606 may then be mounted on catheter body 210, and the cylindrical proximal and distal portions of the tube may be attached to catheter body 210 on both axial sides (proximal and distal) of lateral opening 448.

Circumferential portion 591 of inner membrane 589 snugly touches (e.g., is cylindrical and tightly wrapped around, and does not define any folds) a circumferential portion of outer lateral wall 592 of catheter body 210 (e.g., which circumferential portion does not define lateral opening 448). Circumferential portion 591 typically is a portion of inner membrane 589 that is farther from axial center 11 of lateral opening 448 than from a point 446 on central longitudinal axis 533 of suction lumen 530 closest to axial center 11. Circumferential portion 591 typically surrounds at least 180 degrees of catheter body 210 and/or less than 270 degrees of catheter body 210 (the degrees being measured from rays radiating from central longitudinal axis 533 of suction lumen 530). For some applications, collapsible membrane portion 596 surrounds at least 60 degrees of catheter body 210 and/or less than 180 degrees of catheter body 210 (the degrees being measured from rays radiating from central longitudinal axis 533 of suction lumen 530).

In contrast, typically at least 30%, such as at least 50%, of the membrane area of bulge portion 602 is self-biased to bulge outwards. In particular, bulge portion 602 may comprise bulge area portion 599 of inner membrane 589 which is radially (with respect to central longitudinal axis 533 of suction lumen 530) above lateral opening 448. The height h of bulge portion 602, measured radially outwards from axial center 11 of lateral opening 448, is at least 50% of the diameter of suction lumen 530, such as at least 100% of the diameter of suction lumen 530.

Figure 6B:
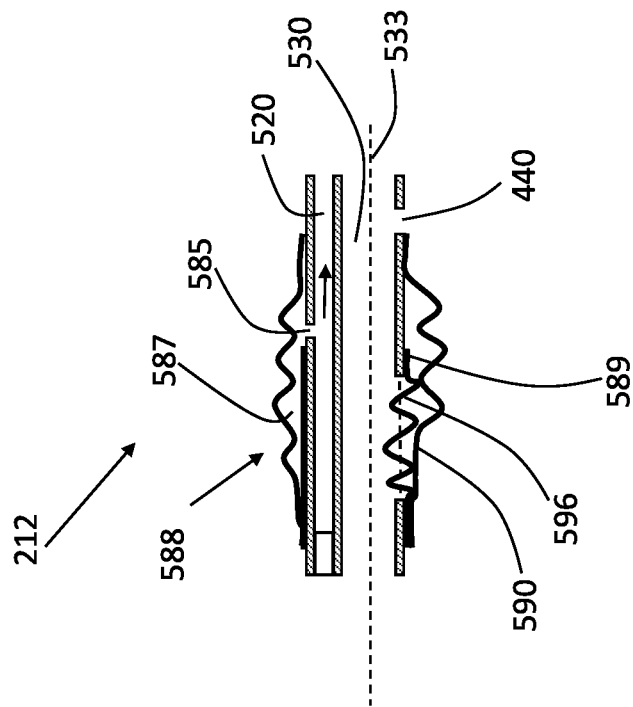
FIGS. 6A-C are schematic illustration of another configuration of a distal portion of a cleaning catheter of the cleaning system of FIG. 1, in accordance with an application of the present invention.
Figure 6A:
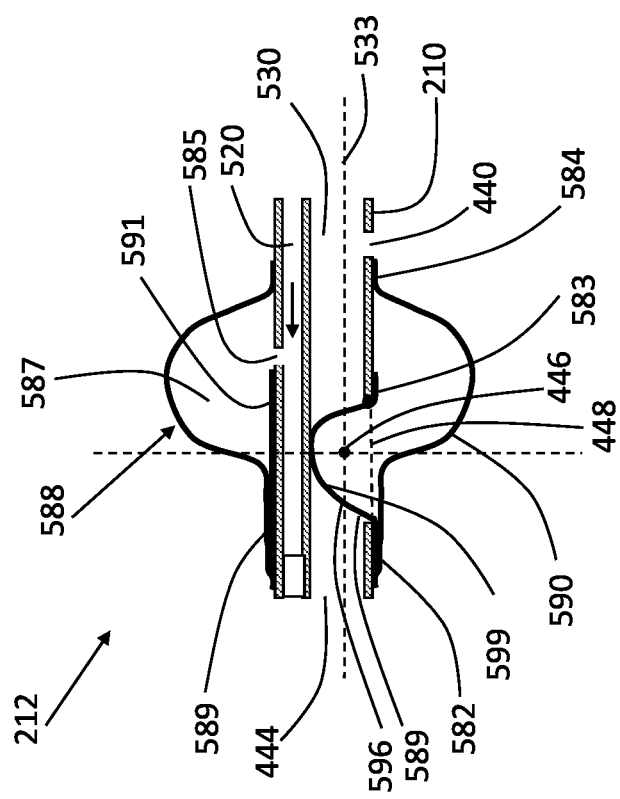
Figure 6C:
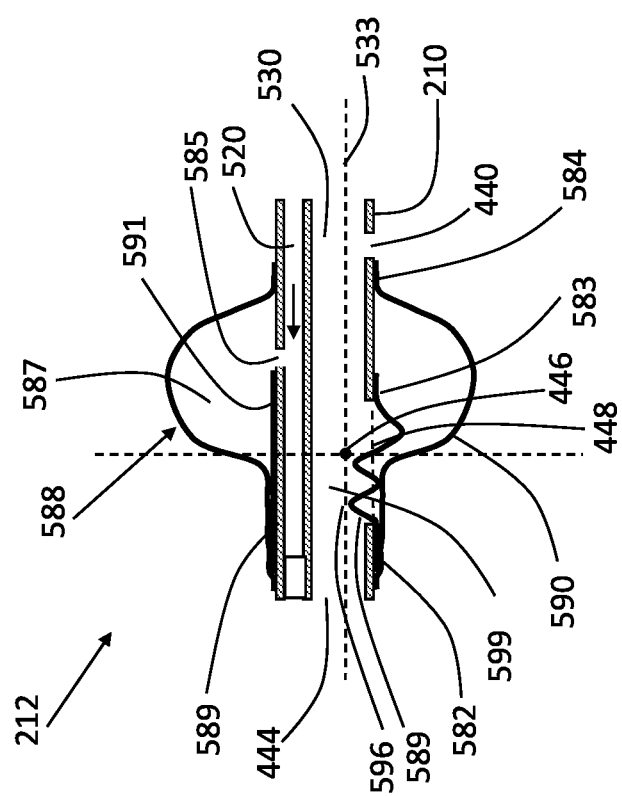

Reference is now made to FIGS. 6A-C, which are schematic illustration of another configuration of distal portion 212 of cleaning catheter 200, in accordance with an application of the present invention. FIG. 6A shows the occluding state of collapsible membrane portion 596, in which positive gauge pressure (greater than ambient atmospheric pressure) is applied through the one or more fluid-delivery inflation lumens 520. FIG. 6B shows inflatable chamber 587 in a collapsed state (which is assumed at least when inflatable chamber 587 is at a negative gauge pressure of 0.2 atm). In this configuration, lateral opening 448 only partially axially overlaps inflatable chamber 587 of inflatable element 588. As a result, both when inflatable chamber 587 is at ambient pressure (i.e., collapsible membrane portion 596 is in the resting state) and inflatable chamber 587 is at positive gauge pressure (i.e., in the occluding state, as shown in FIG. 6A), collapsible membrane portion 596 thereof only partially axially overlaps inflatable chamber 587. When inflatable chamber 587 is in the collapsed state, as shown in FIG. 6B, collapsible membrane portion 596 is prevented from bulging radially outward by inflatable-element outer wall 590 of inflatable element 588.

FIG. 6C shows the resting state of collapsible membrane portion 596, in which inflatable chamber 587 is at ambient pressure (i.e., no inflation pressure and no deflation suction is applied to the one or more fluid-delivery inflation lumens 520). In this configuration, the height of inflatable-element outer wall 590 is not high enough to accommodate the full extent of the collapsible membrane bulge portion 602. As a result, inflatable-element outer wall 590 and inner membrane 589 are arranged such that at least when collapsible membrane portion 596 assumes the bulged state, collapsible membrane portion 596 touches an inner surface of inflatable-element outer wall 590.

Figure 7B:
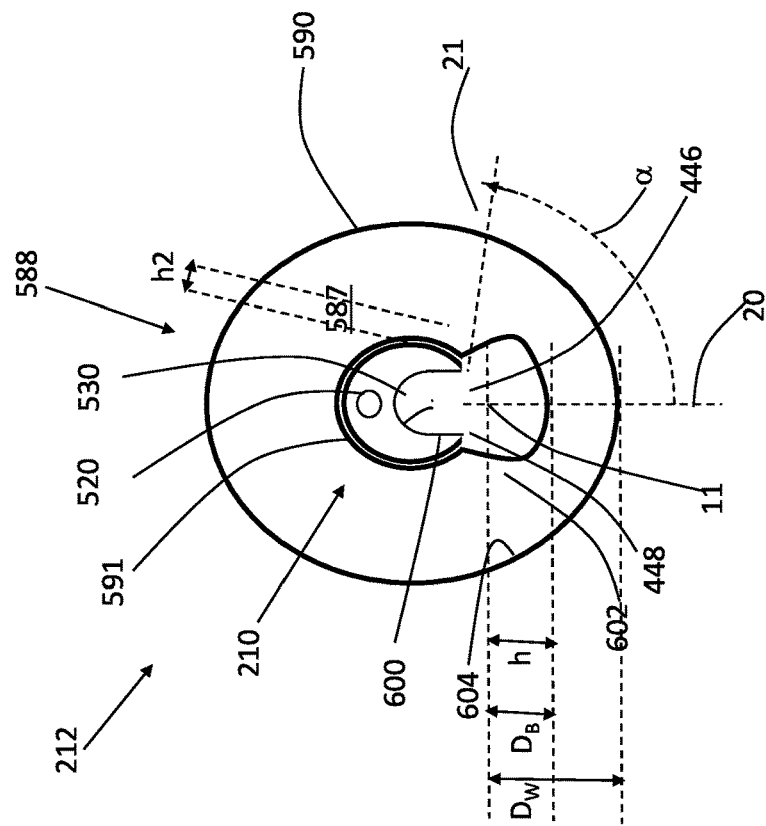
FIGS. 7A-B are schematic illustrations of an alternative configuration the distal portion of a cleaning catheter of the cleaning system of FIG. 1, in accordance with an application of the present invention.
Figure 7A:
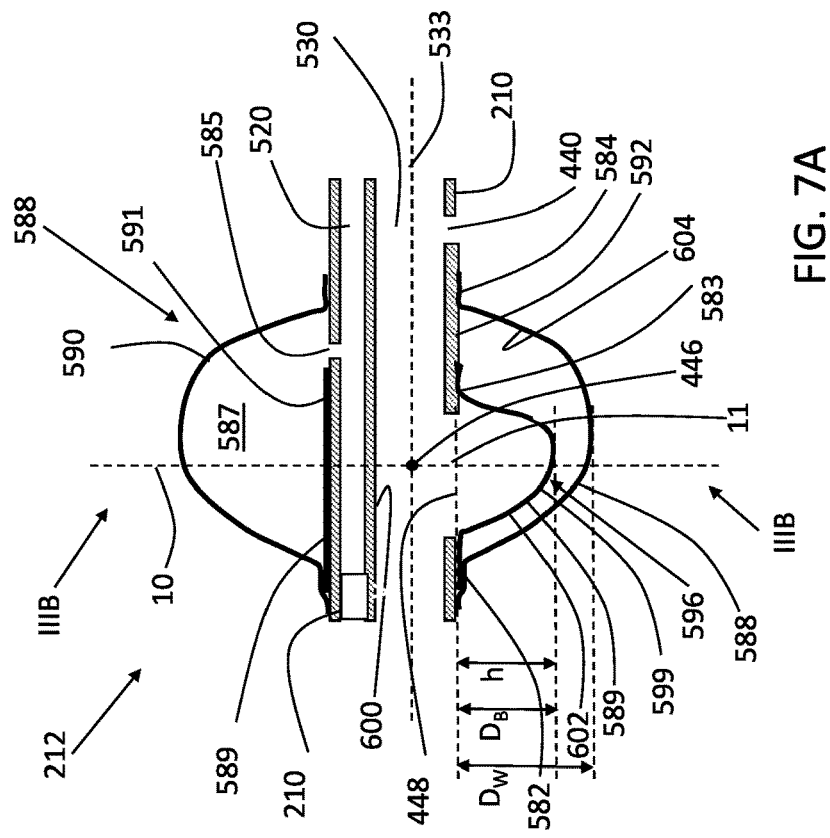

Reference is again made to FIGS. 3A-B, and additionally to FIGS. 7A-B, which are schematic illustrations of an alternative configuration distal portion 212 of cleaning catheter 200, in accordance with an application of the present invention. In the configuration shown in FIGS. 7A-B, lateral opening 448 is formed as a "top" hole into suction lumen 530 (such as by puncturing from above), such that the side walls of the suction lumen at the axial location of the opening are relatively high and substantially complete. In contrast, in the configuration shown in FIGS. 3A-B, lateral opening 448 is formed as a sideways "bite" into the catheter region of suction lumen 530, such that the side walls of the suction lumen at the axial location are relatively low. For some applications, to enable inner membrane 589 to occlude the suction lumen well, the "bite" extends down to, and optionally below, the widest level of the suction lumen. For some applications in which the suction lumen is circular, such as shown in FIGS. 3A-B, the lateral opening "bite" extends down at least to the full diameter level at half height of the suction lumen (i.e., to the level of central longitudinal axis 533 of suction lumen 530).

Reference is again made to FIG. 1. When inflated, inflatable element 588 typically provides two types of functionality: (i) flow obstruction functionality to significantly hinder fluid flow between locations on opposite longitudinal sides of inflatable element 588, and/or (ii) wiping functionality useful for cleaning the inner surface of ventilation tube 160. Typically, cleaning system 100 operates in a closed system environment.

During one state of operation, cleaning system 100 cleans the inner surface of ventilation tube 160 when ventilation tube-connector assembly 158 mediates a substantially air-tight seal between (i) ventilator 170 and/or an interior of ventilator port 664 and (ii) an interior of ventilation tube 160 and/or an interior of the ventilation tube port.

Concurrently with maintaining of this ventilation machine-ventilator tube seal, inflatable element 588 may be positioned within ventilation tube 160 (e.g., in a distal portion of ventilation tube 160), for example by moving a distal end of catheter body 210 in a distal direction towards a distal end of ventilation tube 160. For example, inflatable element 588 may be distally advanced when inflatable element 588 is in a non-contact state (i.e., not in contact with the inner surface of ventilation tube 160). After inflatable element 588 is thus positioned, inflation of inflatable element 588 induces contact between inflatable-element outer wall 590 and the inner surface of ventilation tube 160 and/or obstructs (i.e., substantially hinders) longitudinal flow between proximal and distal portions of the interior of ventilation tube 160.

Upon inflation of inflatable element 588 when inflatable element 588 is positioned within ventilation tube 160, the inflated inflatable element forms a sliding boundary which obstructs (i.e., substantially hinders) fluid flow to between: (a) a more proximal portion of an interstitial region outside of catheter body 210 and within ventilation tube 160 and (b) locations within the ventilation tube 160 that are distal to the slidable boundary formed and delineated by inflatable element 588. This slidable boundary between the proximal and distal portions may be useful for facilitating the cleaning of the inner surface of ventilation tube 160 (by wiping), for example for substantially confining locations of negative pressure and/or fluid (e.g., pressurized fluid) introduced into an interstitial region outside of catheter body 210 and within ventilation tube 160 so that the suction is introduced predominantly in the proximal portion of ventilation tube 160.

For some applications, cleaning catheter 200, configured as described with reference to FIGS. 1-5 is used to modulate relative levels of suction delivered by suction lumen 530 to (a) distal-most suction orifice 444 and (b) the one or more lateral suction orifices 440 between at least two levels that include:

a relatively low distal-most level, in which a level of suction delivered to distal-most suction orifice 444 is less than 25% of a level of suction delivered to one of the one or more lateral suction orifices 440 having a greatest cross-sectional area, and a relatively high distal-most level, in which the level of suction delivered to distal-most suction orifice 444 is greater than 25% of the level of suction delivered to the one of the one or more lateral suction orifices 440 having the greatest cross-sectional area.

For some applications, at the relatively low distal-most level, the level of suction delivered to distal-most suction orifice 444 is less than 10% of the level of suction delivered to the one of the one or more lateral suction orifices 440 having the greatest cross-sectional area, and, at the relatively high distal-most level, the level of suction delivered to distal-most suction orifice 444 is greater than 10% of the level of suction delivered to the one of the one or more lateral suction orifices 440 having the greatest cross-sectional area. For some applications, in the relatively low distal-most level, substantially no suction is delivered to distal-most suction orifice 444.

In configuration in which catheter body 210 is not shaped so as to define any proximal lateral suction orifices 440, the high level of suction flow occurs when inflatable element 588 is in a deflated state, and the low levels of suction flow occur when inflatable element 588 is in the inflated state.

For some applications, inflatable element 588 and inflatable chamber 587 are inflated via one or more fluid-delivery inflation lumens 520, as shown in FIGS. 3A-D.

For some applications, an alternative configuration is provided in which inner membrane 589 and inflatable element 588 are positioned at different axial locations along catheter body 210. In this configuration, inner membrane 589 defines inflatable chamber 587 with an inner surface of one of the one or more fluid-delivery inflation lumens 520, rather than with inflatable element 588. Typically, inflatable chamber 587 and inflatable element 588 are inflated via the same lumen. Alternatively, they are inflated via different lumens, which may or may not be in fluid communication either along catheter body 210 and/or in a flow regulator 700 (shown in FIG. 2).

For some applications, a method, which optionally uses the configuration of cleaning catheter 200 described hereinabove with reference to FIGS. 1-5, comprises:

providing cleaning catheter 200, which includes (a) catheter body 210, which is shaped so as to define distal-most suction orifice 444 and one or more lateral suction orifices 440, and (b) inflatable element 588, which is mounted to catheter body 210 axially between (i) distal-most suction orifice 444 and optionally (ii) one or more lateral suction orifices 440; and modulating relative levels of suction delivered by suction source 601 to (a) distal-most suction orifice 444 and (b) one or more lateral suction orifices 440.

For some applications, modulating comprises modulating the relative levels of suction between at least two levels that include:

a relatively low distal-most level, in which a level of suction delivered to distal-most suction orifice 444 is less than 25% of a level of suction delivered to one of the one or more lateral suction orifices 440 having a greatest cross-sectional area, and a relatively high distal-most level, in which the level of suction delivered to distal-most suction orifice 444 is greater than 25% of the level of suction delivered to the one of the one or more lateral suction orifices 440 having the greatest cross-sectional area.

For some applications, modulating comprises modulating the relative levels of suction between the at least two levels that include:

the relatively low distal-most level, in which the level of suction delivered to distal-most suction orifice 444 is less than 10% of the level of suction delivered to the one of the one or more lateral suction orifices 440 having a greatest cross-sectional area, and the relatively high distal-most level, in which the level of suction delivered to distal-most suction orifice 444 is greater than 10% of the level of suction delivered to the one of the one or more lateral suction orifices 440 having the greatest cross-sectional area.

For some applications, modulating the relative levels of suction comprises reversibly modulating a level of occlusion of at least one of the one or more suction lumens 530 at a portion thereof axially between (x) distal-most suction orifice 444 and (y) the one or more lateral suction orifices 440. For some applications, and modulating the relative levels of suction comprises reversibly modulating a level of occlusion of suction lumen 530 at a portion thereof axially between (a) distal-most suction orifice 444 and optionally (b) one or more lateral suction orifices 440.

For some applications, the method further comprises, before modulating the relative levels of suction, inserting distal portion 212 of cleaning catheter 200 into tracheal ventilation tube 160 inserted in a trachea of a patient.

For cleaning tracheal ventilation tube 160, the cleaning action typically comprises the following steps, which are typically performed in the following order:

inserting cleaning catheter 200 into tracheal ventilation tube 160 in a proximal to distal direction while inflatable element 588 is essentially deflated;

inflating inflatable element 588 at a location near the distal end of tracheal ventilation tube 160 (typically within 2 cm of the distal end);

withdrawing cleaning catheter 200 along tracheal ventilation tube 160 in a distal to proximal direction while inflatable chamber 587 is inflated and suction is applied; because inflatable chamber 587 is inflated, collapsible membrane portion 596 assumes the occluding state, and most or all of the applied suction is applied to the one or more lateral suction orifices 440; and deflating inflatable chamber 587 when inflatable element 588 is near the proximal end of tracheal ventilation tube 160 or fully outside the proximal end of the tracheal ventilation tube 160.

Cleaning system 100 may also be used for suctioning the trachea outside of and distal to tracheal ventilation tube 160 when inflatable chamber 587 is not inflated. Collapsible membrane portion 596 thus does not substantially occlude suction lumen 530, such that the applied suction is applied mostly or entirely to distal-most suction orifice 444.

In the description and claims of the present application, each of the verbs, "comprise," "include" and "have," and conjugates thereof, are used to indicate that the object or objects of the verb are not necessarily a complete listing of members, components, elements or parts of the subject or subjects of the verb. The articles "a" and "an" are used herein to refer to one or to more than one (i.e., to at least one) of the grammatical object of the article. By way of example, "an element" means one element or more than one element. The term "including" is used herein to mean, and is used interchangeably with, the phrase "including but not limited to." The term "or" is used herein to mean, and is used interchangeably with, the term "and/or," unless context clearly indicates otherwise. The term "such as" is used herein to mean, and is used interchangeably, with the phrase "such as but not limited to."

All publications, patent applications, patents, and other references mentioned herein are incorporated by reference in their entirety. In case of conflict, the present patent specification, including definitions, will prevail. In addition, the materials, methods, and examples are illustrative only and not intended to be limiting.

For brevity, some explicit combinations of various features are not explicitly illustrated in the figures and/or described. It is now disclosed that any combination of the method or device features disclosed herein can be combined in any manner—including any combination of features—any combination of features can be included in any embodiment and/or omitted from any embodiments.

The scope of the present invention comprises embodiments described in the following applications, which are assigned to the assignee of the present application and are incorporated herein by reference. In an embodiment, techniques and apparatus described in one or more of the following applications are combined with techniques and apparatus described herein:

PCT Publication WO/2012/131626 to Einav et al.
GB 2482618 A to Einav et al.;
UK Application GB 1119794.4, filed Nov. 16, 2011;
U.S. Provisional Application 61/468,990, filed Mar. 29, 2011;
U.S. Provisional Application 61/473,790, filed Apr. 10, 2011;
U.S. Provisional Application 61/483,699, filed May 8, 2011;
U.S. Provisional Application 61/496,019, filed Jun. 12, 2011;
U.S. Provisional Application 61/527,658, filed Aug. 26, 2011;
U.S. Provisional Application 61/539,998, filed Sep. 28, 2011;
U.S. Provisional Application 61/560,385, filed Nov. 16, 2011;
U.S. Provisional Application 61/603,340, filed Feb. 26, 2012;
U.S. Provisional Application 61/603,344, filed Feb. 26, 2012;
U.S. Provisional Application 61/609,763, filed Mar. 12, 2012;
U.S. Provisional Application 61/613,408, filed Mar. 20, 2012;
U.S. Provisional Application 61/635,360, filed Apr. 19, 2012;
U.S. Provisional Application 61/655,801, filed Jun. 5, 2012;
U.S. Provisional Application 61/660,832, filed Jun. 18, 2012;
U.S. Provisional Application 61/673,744, filed Jul. 20, 2012;
PCT Publication WO 2013/030821 to Zachar et al.;
U.S. Pat. No. 8,999,074 to Zachar et al;
UK Application 1600233.9, filed Jan. 6, 2016;
U.S. Provisional Application 62/287,223, filed Jan. 26, 2016;
U.S. Provisional Application 62/319,640, filed Apr. 7, 2016;
U.S. Provisional Application 62/336,753, filed May 16, 2016; and
U.S. Provisional Application 62/336,894, filed May 16, 2016.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. Apparatus for use with a suction source, the apparatus comprising a cleaning catheter, which comprises:
   an elongate, tubular catheter body, which is shaped so as to define (a) a distal-most suction orifice, (b) a suction lumen, which (i) is arranged along the catheter body at least partially within the catheter body, and (ii) includes a proximal longitudinal portion that is coupleable in fluid communication with the suction source, and (c) an outer lateral wall, which is shaped so as to define a lateral opening therethrough into the suction lumen, wherein the lateral opening is disposed distal to the proximal longitudinal portion of the suction lumen;
   an inflatable element, which comprises an inflatable-element outer wall, and is mounted to the catheter body; and
   an inner membrane, which:
      is at least partially positioned within an interior of the inflatable element and is mounted to the catheter body around the lateral opening along an air-tight seal perimeter that surrounds the lateral opening, so as to define a collapsible membrane portion that covers the lateral opening, and, together with the inflatable-element outer wall, defines an inflatable chamber between the inflatable-element outer wall and the collapsible membrane portion,
      entirely surrounds the catheter body, and
      is arranged such that at least when the inflatable chamber is at ambient pressure, the proximal longitudinal portion of the suction lumen is in fluid communication with the distal-most suction orifice.

2. The apparatus according to claim 1, wherein a circumferential portion of the inner membrane snugly touches a circumferential portion of the outer lateral wall of the catheter body, which circumferential portion does not define the lateral opening.

3. The apparatus according to claim 1,
   wherein the seal perimeter defines a straight distance between two points on the seal perimeter that are most distant from each other, and
   wherein the inner membrane is arranged such that the collapsible membrane portion has excess material that covers the lateral opening such that a total length of a shortest path along the collapsible membrane portion between the two most distant points on the seal perimeter of the lateral opening equals at least 120% of the straight distance between the two points, at least when the inflatable chamber is at ambient pressure.

4. The apparatus according to claim 3, wherein the shortest path along the collapsible membrane portion equals at least 150% of the straight distance the two points, at least when the inflatable chamber is at ambient pressure.

5. The apparatus according to claim 1, wherein a surface area of the collapsible membrane portion varies by less than 30% between when the inflatable chamber is at ambient pressure and when the inflatable chamber is at a positive gauge pressure of 0.5 atm.

6. The apparatus according to claim 1, wherein the catheter body is shaped so as to define one or more lateral suction orifices, which are located proximal to the inflatable element, and are in fluid communication with the suction lumen.

7. The apparatus according to claim 1, wherein the inflatable element has a greatest diameter of between 6 and 12 mm when inflated at 0.5 atm gauge pressure and unconstrained.

8. The apparatus according to claim 1, wherein, at least when the inflatable chamber is at ambient pressure, the collapsible membrane portion is axially surrounded by the inflatable chamber.

9. Apparatus for use with a suction source, the apparatus comprising a cleaning catheter, which comprises:
   an elongate, tubular catheter body, which is shaped so as to define (a) a distal-most suction orifice, (b) a suction lumen, which (i) is arranged along the catheter body at least partially within the catheter body, and (ii) includes a proximal longitudinal portion that is coupleable in fluid communication with the suction source, and (c) an outer lateral wall, which is shaped so as to define a lateral opening therethrough into the suction lumen, wherein the lateral opening is disposed distal to the proximal longitudinal portion of the suction lumen;
   an inflatable element, which comprises an inflatable-element outer wall, and is mounted to the catheter body; and
   an inner membrane, which is at least partially positioned within an interior of the inflatable element and is mounted to the catheter body around the lateral opening along an air-tight seal perimeter that surrounds the lateral opening, so as to define a collapsible membrane portion that covers the lateral opening, and, together with the inflatable-element outer wall, defines an inflatable chamber between the inflatable-element outer wall and the collapsible membrane portion,
   wherein the inner membrane is arranged such that at least when the inflatable chamber is at ambient pressure, the proximal longitudinal portion of the suction lumen is in fluid communication with the distal-most suction orifice, and
   wherein when the inflatable chamber is at ambient pressure, the collapsible membrane portion is biased to assume a bulged state, in which the collapsible membrane portion is shaped so as to define a bulge portion having a greatest bulge distance from the seal perimeter of at least 1 mm, measured radially outward or radially inward from the seal perimeter.

10. The apparatus according to claim 9, wherein the greatest bulge distance is at least 1.5 mm.

11. The apparatus according to claim 9, wherein the bulge portion bulges radially outward and not radially inward.

12. The apparatus according to claim 9, wherein the inflatable-element outer wall and the inner membrane are arranged such that at least when the collapsible membrane portion assumes the bulged state, the collapsible membrane portion touches an inner surface of the inflatable-element outer wall.

13. The apparatus according to claim 9, wherein the inflatable-element outer wall and the inner membrane are arranged such that at least when the collapsible membrane portion assumes the bulged state, the collapsible membrane portion does not touch an inner surface of the inflatable-element outer wall.

14. The apparatus according to claim 9,
   wherein the seal perimeter defines a straight distance between two points on the seal perimeter that are most distant from each other, and
   wherein the inner membrane is arranged such that the collapsible membrane portion has excess material that covers the lateral opening such that a total length of a shortest path along the collapsible membrane portion between the two most distant points on the seal perimeter of the lateral opening equals at least 120% of the straight distance between the two points, at least when the inflatable chamber is at ambient pressure.

15. The apparatus according to claim 14, wherein the shortest path along the collapsible membrane portion equals at least 150% of the straight distance the two points, at least when the inflatable chamber is at ambient pressure.

16. The apparatus according to claim 9, wherein a surface area of the collapsible membrane portion varies by less than 30% between when the inflatable chamber is at ambient pressure and when the inflatable chamber is at a positive gauge pressure of 0.5 atm.

17. The apparatus according to claim 9, wherein the catheter body is shaped so as to define one or more lateral suction orifices, which are located proximal to the inflatable element, and are in fluid communication with the suction lumen.

18. The apparatus according to claim 9, wherein the inflatable element has a greatest diameter of between 6 and 12 mm when inflated at 0.5 atm gauge pressure and unconstrained.

19. The apparatus according to claim 9, wherein, at least when the inflatable chamber is at ambient pressure, the collapsible membrane portion is axially surrounded by the inflatable chamber.

20. A method for use with a suction source, the method comprising:
   (1) providing a cleaning catheter, which comprises:
      an elongate, tubular catheter body, which is shaped so as to define (a) a distal-most suction orifice, and (b) a suction lumen, which (i) is arranged along the catheter body at least partially within the catheter body, and (ii) includes a proximal longitudinal portion that is coupleable in fluid communication with the suction source, and (c) an outer lateral wall, which is shaped so as to define a lateral opening therethrough into the suction lumen, wherein the lateral opening is disposed distal to the proximal longitudinal portion of the suction lumen;
      an inflatable element, which comprises an inflatable-element outer wall, and is mounted to the catheter body; and
      an inner membrane, which is at least partially positioned within an interior of the inflatable element and is mounted to the catheter body around the lateral opening along an air-tight seal perimeter that surrounds the lateral opening, so as to define a collapsible membrane portion that covers the lateral opening, and, together with the inflatable-element outer wall, defines an inflatable chamber between the inflatable-element outer wall and the collapsible membrane portion,
      wherein the inner membrane entirely surrounds the catheter body, and wherein the inner membrane is arranged such that:
         (a) at least when the inflatable chamber is at ambient pressure, the proximal longitudinal portion of the suction lumen is in fluid communication with the distal-most suction orifice, and
         (b) at least when the inflatable chamber is at a gauge pressure of 0.5 atm, the collapsible membrane portion assumes an occluding state, in which the collapsible membrane portion at least partially touches an inner surface of the suction lumen across from the lateral opening, thereby at least partially occluding the suction lumen and modulating a level of suction fluid flow into the suction lumen through the distal-most suction orifice;

(2) inserting the cleaning catheter into a tracheal ventilation tube; and (3) applying positive pressure of between 0.2 atm and 2 atm to the inflatable chamber such that the collapsible membrane portion assumes the occluding state.

* * * * *